United States Patent
Kato et al.

(10) Patent No.: US 11,710,087 B2
(45) Date of Patent: Jul. 25, 2023

(54) REPLANNED PLAN OUTPUT DEVICE

(71) Applicant: Hitachi, Ltd., Tokyo (JP)

(72) Inventors: Akiko Kato, Tokyo (JP); Tsuyoshi Minakawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/411,085

(22) Filed: Aug. 25, 2021

(65) Prior Publication Data

US 2022/0300879 A1   Sep. 22, 2022

(30) Foreign Application Priority Data

Mar. 19, 2021   (JP) ................................ 2021-046663

(51) Int. Cl.
 *G06Q 10/0631*   (2023.01)
 *G06F 16/901*   (2019.01)
 (Continued)

(52) U.S. Cl.
 CPC ... *G06Q 10/06313* (2013.01); *G06F 16/9024* (2019.01); *G06Q 10/06312* (2013.01);
 (Continued)

(58) Field of Classification Search
 None
 See application file for complete search history.

(56) References Cited

U.S. PATENT DOCUMENTS

| | | | |
|---|---|---|---|
| 6,529,877 B1* | 3/2003 | Murphy | G06Q 10/0639 705/7.22 |
| 2005/0209912 A1* | 9/2005 | Veeningen | G06Q 10/10 705/7.12 |

(Continued)

FOREIGN PATENT DOCUMENTS

| | | | |
|---|---|---|---|
| JP | 5-174746 B2 | 4/2013 | |
| JP | 2017-151810 A | 8/2017 | |
| WO | WO-2005007483 A1 * | 1/2005 | .............. B61L 17/00 |

OTHER PUBLICATIONS

Saunders et al Issues in Fire Vehicle Replacement: Users' Views and Synthesis, Jan. 1976, Natural Bureau of Standards Technical Notes, pp. 1-15 (Year: 1976).*

(Continued)

*Primary Examiner* — Romain Jeanty
(74) *Attorney, Agent, or Firm* — Mattingly & Malur, PC

(57) ABSTRACT

A replanned plan output device that outputs a replanned plan for an operation plan of performing planned schedules in order by an operation of a vehicle in charge, includes: a replanned candidate determination unit configured to, when a difficult-to-perform schedule that becomes difficult to be performed by the vehicle in charge among the planned schedules occurs, determine another vehicle as a candidate for a substitute vehicle for performing the difficult-to-perform schedule; and a substitute vehicle selection unit configured to, when a plurality of candidates for the substitute vehicle are set, select the substitute vehicle for performing the difficult-to-perform schedule from the plurality of candidates for the substitute vehicle in consideration of the number of changes of the vehicle in charge and an additional cost of each of the schedules specified in the operation plan.

7 Claims, 15 Drawing Sheets

(51) Int. Cl.
*G08G 1/16* (2006.01)
*G08G 1/00* (2006.01)
*G06Q 50/26* (2012.01)

(52) U.S. Cl.
CPC .............. *G08G 1/162* (2013.01); *G08G 1/202* (2013.01); *G06Q 50/26* (2013.01)

(56) References Cited

U.S. PATENT DOCUMENTS

| | | | | |
|---|---|---|---|---|
| 2007/0260506 | A1* | 11/2007 | Fitzpatrick | G06Q 10/10 |
| | | | | 705/7.22 |
| 2008/0127041 | A1* | 5/2008 | Gura | G06Q 10/06313 |
| | | | | 717/101 |
| 2008/0255907 | A1* | 10/2008 | Motoyama | G06Q 10/06 |
| | | | | 705/7.23 |
| 2017/0116551 | A1* | 4/2017 | Kubo | G06Q 10/06311 |

OTHER PUBLICATIONS

Extended European Search Report received in corresponding European Application No. 21195619.8 dated Mar. 10, 2022.

* cited by examiner

| VEHICLE 1 | SCHEDULE 1 | SCHEDULE 2 | SCHEDULE 3 | SCHEDULE 4 | - | - |
|---|---|---|---|---|---|---|
| VEHICLE 2 | SCHEDULE 5 | SCHEDULE 6 | - | - | - | - |
| VEHICLE 3 | SCHEDULE 7 | SCHEDULE 8 | - | - | - | - |
| VEHICLE 4 | SCHEDULE 9 | SCHEDULE 10 | SCHEDULE 11 | - | - | - |
| VEHICLE 5 | SCHEDULE 12 | SCHEDULE 13 | SCHEDULE 14 | SCHEDULE 15 | SCHEDULE 16 | SCHEDULE 17 |
| VEHICLE 6 | SCHEDULE 18 | SCHEDULE 19 | SCHEDULE 20 | - | - | - |
| VEHICLE 7 | SCHEDULE 21 | SCHEDULE 22 | SCHEDULE 23 | SCHEDULE 24 | - | - |
| VEHICLE 8 | - | - | - | - | - | - |

| SCHEDULE | DEPARTURE TIME | ARRIVAL TIME | DEPARTURE PLACE | ARRIVAL PLACE | VEHICLE TYPE |
|---|---|---|---|---|---|
| SCHEDULE 1 | 7:10 | 9:10 | XX TRAIN STATION (A) | ZZ UNIVERSITY (B) | 1 |
| SCHEDULE 2 | 7:35 | 8:10 | ZZ UNIVERSITY (B) | XX TRAIN STATION (A) | 1 |
| SCHEDULE 3 | 14:30 | 16:00 | XX TRAIN STATION (A) | WW TRAIN STATION (C) | 1 |
| SCHEDULE 4 | 17:00 | 18:30 | WW TRAIN STATION (C) | XX TRAIN STATION (A) | 1 |
| SCHEDULE 5 | 9:30 | 10:30 | WW TRAIN STATION (C) | ZZ UNIVERSITY (B) | 2 |
| ⋮ | ⋮ | ⋮ | ⋮ | ⋮ | ⋮ |
| SCHEDULE 8 | 16:20 | 17:20 | WW TRAIN STATION (C) | ZZ UNIVERSITY (B) | 3 |
| ⋮ | ⋮ | ⋮ | ⋮ | ⋮ | ⋮ |

FIG. 12

CHANGE CANDIDATE TABLE

| | | PLANNED CANDIDATE: $j$ | | | | | |
|---|---|---|---|---|---|---|---|
| | | $j=1$ | $j=2$ | $j=3$ | $j=4$ | $j=5$ | ... |
| NODE NUMBER: $i$ | $i=1$: VEHICLE 1 | 1 | 0 | 0 | 0 | 0 | |
| | $i=2$: VEHICLE 2 | 0 | 1 | 0 | 1 | 0 | |
| | $i=3$: VEHICLE 3 | 0 | 0 | 1 | 0 | 0 | |
| | ... | | | | | | |
| | $i=8$: VEHICLE 8 | 0 | 0 | 0 | 0 | 1 | |
| | $i=9$: SCHEDULE 1 | 1 | 0 | 0 | 0 | 0 | |
| | $i=10$: SCHEDULE 2 | 1 | 0 | 0 | 0 | 0 | |
| | $i=11$: SCHEDULE 3 | 1 | 0 | 0 | 0 | 0 | |
| | $i=12$: SCHEDULE 4 | 1 | 0 | 0 | 0 | 0 | |
| | $i=13$: SCHEDULE 5 | 0 | 1 | 0 | 1 | 0 | |
| | $i=14$: SCHEDULE 6 | 0 | 1 | 0 | 1 | 0 | |
| | $i=15$: SCHEDULE 7 | 0 | 0 | 1 | 0 | 0 | |
| | $i=16$: SCHEDULE 8 | 0 | 0 | (1) | 1 | 1 | |
| | $i=17$: ADDITION 1 | 0 | 0 | 0 | 0 | 1 | |
| ADDITION COST: $C_j$ | | 0 | 0 | - | 0.1 | 0.5 | |

FIG. 14

MATRIX Aij AND COST VECTOR Cj

| | | PLANNED CANDIDATE: $j$ | | | | |
|---|---|---|---|---|---|---|
| | | $j=1$ | $j=2$ | $j=3$ | $j=4$ | $j=5$ | ... |
| NODE NUMBER: $i$ | $i=1$: VEHICLE 1 | 1 | 0 | 0 | 0 | 0 | |
| | $i=2$: VEHICLE 2 | 0 | 1 | 0 | 1 | 0 | |
| | $i=3$: VEHICLE 3 | 0 | 0 | 1 | 0 | 0 | |
| | ... | | | | | | |
| | $i=8$: VEHICLE 8 | 0 | 0 | 0 | 0 | 1 | |
| | $i=9$: SCHEDULE 1 | 1 | 0 | 0 | 0 | 0 | |
| | $i=10$: SCHEDULE 2 | 1 | 0 | 0 | 0 | 0 | |
| | $i=11$: SCHEDULE 3 | 1 | 0 | 0 | 0 | 0 | |
| | $i=12$: SCHEDULE 4 | 1 | 0 | 0 | 0 | 0 | |
| | $i=13$: SCHEDULE 5 | 0 | 1 | 0 | 1 | 0 | |
| | $i=14$: SCHEDULE 6 | 0 | 1 | 0 | 1 | 0 | |
| | $i=15$: SCHEDULE 7 | 0 | 0 | 1 | 0 | 0 | |
| | $i=16$: SCHEDULE 8 | 0 | 0 | 0 | 1 | 1 | |
| | $i=17$: ADDITION 1 | 0 | 0 | 0 | 0 | 1 | |
| ADDITION COST: $C_j$ | | 0 | 0 | 0 | 0.1 | 0.5 | |

EXAMPLE OF CHANGE INFORMATION

| | | PLANNED CANDIDATE : $j$ | | | | | |
|---|---|---|---|---|---|---|---|
| | | $j=1$ | $j=2$ | $j=3$ | $j=4$ | $j=5$ | ... |
| NODE NUMBER : $i$ | $i=1$: VEHICLE 1 | 1 | 0 | 0 | 0 | 0 | |
| | $i=2$: VEHICLE 2 | 0 | 1 | 0 | 1 | 0 | |
| | $i=3$: VEHICLE 3 | 0 | 0 | 1 | 0 | 0 | |
| | .. | | | | | | |
| | $i=8$: VEHICLE 8 | 0 | 0 | 0 | 0 | 1 | |
| | $i=9$: SCHEDULE 1 | 0 | 0 | 0 | 0 | 0 | |
| | $i=10$: SCHEDULE 2 | 0 | 0 | 0 | 0 | 0 | |
| | $i=11$: SCHEDULE 3 | 0 | 0 | 0 | 0 | 0 | |
| | $i=12$: SCHEDULE 4 | 0 | 0 | 0 | 0 | 0 | |
| | $i=13$: SCHEDULE 5 | 0 | 0 | 0 | 0 | 0 | |
| | $i=14$: SCHEDULE 6 | 0 | 0 | 0 | 0 | 0 | |
| | $i=15$: SCHEDULE 7 | 0 | 0 | 0 | 0 | 0 | |
| | $i=16$: SCHEDULE 8 | 0 | 0 | 0 | -1 | -1 | |
| | $i=17$: ADDITION 1 | 0 | 0 | 0 | 0 | 1 | |

501

REPLANNED PLAN OUTPUT DEVICE

CROSS-REFERENCE TO RELATED APPLICATION

The present application claims priority from Japanese application JP 2021-046663, filed on Mar. 19, 2021, the contents of which is hereby incorporated by reference into this application.

BACKGROUND OF THE INVENTION

1. Field of the Invention

The present invention relates to a replanned plan output device, and relates to, as a non-limiting specific example, a technology for automatically replanning an operation plan by using a dedicated processor or the like when it is required to change a planned operation plan of a public transportation system.

2. Description of Related Art

In a public transportation system, various unpredictable situations (hereinafter referred to as accidents) such as a malfunction of a vehicle (a vehicle and equipment) often cause occurrence of a case in which the operation cannot be performed as planned.

When the accident as described above occurs, it is required to replan the operation plan after the accident occurrence. In related art, the work of replanning the operation plan significantly relies on manual work (a manual input operation) by an operator or the like.

When mechanical processing can be performed on the replanning of the operation plan, it becomes possible to perform the replanning based on non-individual expertise and an objective indicator. Therefore, it is considered that seeds or needs for automation of the replanning are increasing.

The present inventors conducted an intensive study thereon and come up with the following ideas, based on a knowledge or concept that such replanning can be solved by a computer as an "optimization problem".

That is, in order to solve a large-scale optimization problem in a real society at high speed, for example, it is conceivable to provide a method in which a problem is described with an "interaction model" such as an Ising model or the like, and calculation is performed by using "a calculation technology dedicated to the optimization problem" such as CMOS annealing. When the replanning using the interaction model is performed, as a method for efficiently handling a complicated constraint condition, it is effective to use a unit for solving a set partitioning problem and a set covering problem after candidate generation of a partial problem is performed by using a column generation method or the like.

An example of related art related to the above description includes a technology described in JP-A-2017-151810 below.

JP-A-2017-151810 describes a general set partitioning problem and set covering problem by an interaction model, and describes a configuration for solving an optimization problem at high speed. However, JP-A-2017-151810 does not provide a specific policy for dealing with replanning of an operation plan. When the replanning of the operation plan is performed by using a method described in JP-A-2017-151810, there are many changes in the operation plan, which is considered to be non-suitable for actual work.

SUMMARY OF THE INVENTION

An object of the present invention is to provide a replanned plan output device capable of automatically formulating a replanned plan that reduces the number of changes from an original plan and profit and loss caused by the changes.

As a desirable aspect of the present invention, a replanned plan output device that outputs a replanned plan for an operation plan of performing planned schedules in order by an operation of a vehicle in charge, includes: a vehicle-in-charge candidate determination unit configured to, when a difficult-to-perform schedule that becomes difficult to be performed by the vehicle in charge among the planned schedules occurs, determine another vehicle as a candidate for the vehicle in charge of the difficult-to-perform schedule; and a vehicle-in-charge selection unit configured to, when a plurality of candidates for the vehicle in charge are set, select the vehicle in charge of the difficult-to-perform schedule from the plurality of candidates for the vehicle in charge in consideration of the number of changes of the vehicle in charge and an additional cost of each of the schedules specified in the operation plan.

According to the present invention, when a difficult-to-perform schedule that becomes difficult to be performed by a vehicle in charge occurs, a vehicle in charge of the difficult-to-perform schedule can be selected from a plurality of candidates for the vehicle in charge, in consideration of the number of changes of the vehicle in charge and an additional cost. Therefore, it is possible to automatically formulate a replanned plan that reduces the number of changes from an original plan and profit and loss caused by the changes.

BRIEF DESCRIPTION OF THE DRAWINGS

FIG. 5 is a diagram illustrating an example of a constraint condition;

FIG. 12 is a diagram illustrating an example of a planned candidate (a change candidate table);

FIG. 14 is a diagram illustrating an example of a part of the planned candidate (the change candidate table) of FIG. 12, which becomes a matrix ($A_{ij}$) and a vector (C) that become coefficient values of an interaction model; and FIG. 15 is a diagram illustrating an example of a part of the change information, which becomes a matrix (Di) that becomes the coefficient value of the interaction model.

DESCRIPTION OF EMBODIMENTS

Figure 1:
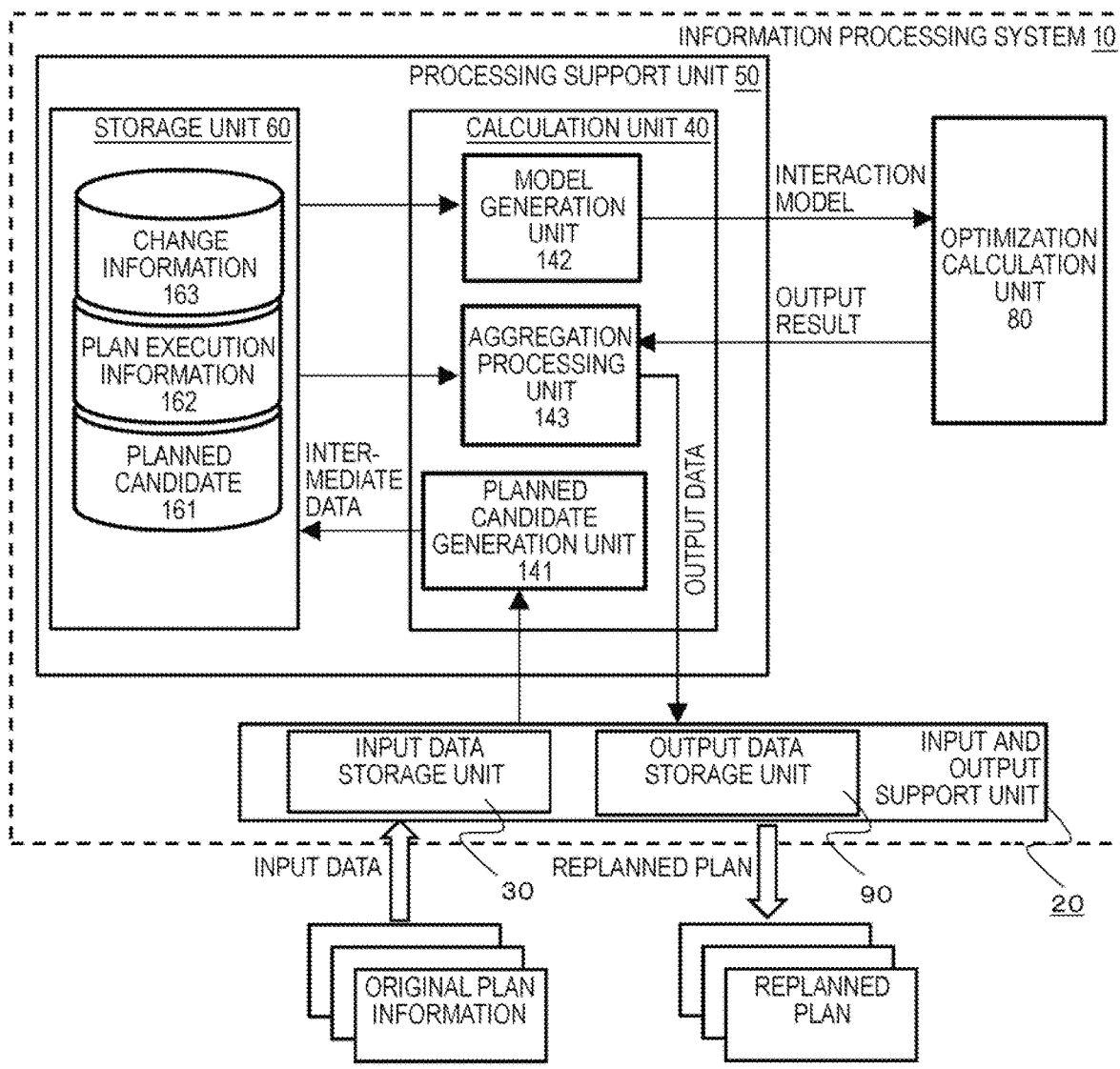
FIG. 1 is a block diagram illustrating an outline of an information processing system on which a replanned plan output device of the present invention is mounted.

An embodiment of the present invention will be described in detail with reference to the drawings. However, the present invention is not construed as being limited to the description of the embodiment shown below. It is easily understood by those skilled in the art that a specific configuration of the embodiment can be changed within the scope of not departing from an idea or gist of the present invention.

In a configuration of the invention described below, the same part or a part having a similar function will be denoted by the same reference sign to be used in common between different drawings, and duplicate description may be omitted.

When there are a plurality of elements having the same or similar function, a different subscript may be added to the same reference sign for description. However, when it is not required to distinguish between the plurality of elements, the subscript may be omitted for description.

In the following description, a "storage device" may be at least a memory of the memory and a permanent storage device. The "memory" is one or more memory devices, which is an example of one or more storage devices, and may typically be a main storage device.

In the following description, the "processor" may be one or more processor devices. At least one processor device can typically use a microprocessor device such as a Central Processing Unit (CPU).

In the following description, for convenience of the description, it may be described that a software block serves as a main part and performs processing, and it is noted that actual processing is mainly performed by the processor.

OUTLINE OF EMBODIMENT

In the embodiment to which the present invention is applied, a replanned plan output device that outputs a replanned plan with respect to an operation plan of sequentially performing planned schedules by an operation of a vehicle in charge can be implemented (mounted) in a computer or a computer system.

The replanned plan output device includes a replanned candidate determination unit that plans a candidate for a plan, in which a difficult-to-perform schedule is performed with another vehicle, by reorganizing the plan after time when the difficult-to-perform schedule occurs, when the difficult-to-perform schedule, which becomes difficult to be performed by a vehicle in charge, occurs among the planned schedules.

The replanned plan output device includes a substitute vehicle selection unit that selects a substitute vehicle for performing the difficult-to-perform schedule from a plurality of candidates for the substitute vehicle in consideration of the number of changes of the vehicle in charge and an additional cost of each of the schedules specified in the operation plan, when the plurality of candidates for the substitute vehicle are set.

The replanned candidate determination unit and the substitute vehicle selection unit can be configured by the same processor or different processors.

In the above description, it is desirable to store the operation plan in a predetermined memory so that the replanned plan output device can refer to the operation plan, process the operation plan, generate the replanned plan, and output the generated replanned plan.

As a specific example (form) of each of the "schedules" in the operation plan, a departure time from the beginning and an arrival time to the end are specified. In the following description, in each schedule to be performed by the same vehicle, it is assumed that the end of a previous schedule and the beginning of a subsequent schedule are the same, and an interval (a break time or the like) can be set between these schedules.

In this case, the replanned candidate determination unit can determine another vehicle that performs a schedule that does not overlap with a time zone from the departure time of the difficult-to-perform schedule to the arrival time thereof as a candidate of the substitute vehicle for performing the difficult-to-perform schedule.

With respect to the vehicle to be used in the operation plan, a type thereof, the number thereof, or the like are not particularly limited, and various types and a large number of vehicles can be used in the actual operation. However, as the types of vehicles and the number thereof increase, a description content becomes more complicated, such that the following embodiments will be described with an example of an operation plan which is simplified as much as possible.

In the above description, as a specific example of "another vehicle" that becomes the candidate for the substitute vehicle for performing the difficult-to-perform schedule, the specific example thereof include vehicles other than a vehicle that becomes difficult to perform a schedule to be performed among the plurality of vehicles specified in the operation plan.

The maximum number of vehicles of the candidate to be determined by the replanned candidate determination unit may be the sum of all the vehicles to which the operation plan for the day is assigned and the number of standby vehicles. When the operation cannot be performed only by the vehicles to which the operation plan for the day is assigned, the standby vehicle will be assigned. However, when there is no standby vehicle and no single vehicle can be determined (when the number of vehicles to be determined is zero), any one of the vehicles specified in the operation plan cannot perform the difficult-to-perform schedule that occurred (serving as the substitute vehicle for performing the difficult-to-perform schedule), such that it is required to prepare another vehicle that is not specified in the operation plan.

On the other hand, normally, as the number of vehicles of the candidate determined by the replanned candidate determination unit becomes larger, processing (a calculation amount) for selecting the substitute vehicle by the substitute vehicle selection unit increases, and thus the content of description is complicated, such that the following embodiments will be described with an example that is as easy to understand as possible.

On the other hand, when the number of vehicles of the candidate determined by the replanned candidate determination unit is small (for example, two or three vehicles), it is not required to perform the processing (calculation or the like) for selecting the vehicle in charge by the substitute vehicle selection unit, and in some cases, the substitute vehicle can be selected by determination of a human being such as an operator or the like.

In consideration of the above-described circumstances, it is considered that the replanned plan output device of the embodiment is particularly useful in a case in which when the number of vehicles of the candidate determined by the replanned candidate determination unit is large, the vehicle that should perform the difficult-to-perform schedule (serving as the substitute vehicle for performing the difficult-to-perform schedule) cannot be promptly determined by a human being.

In such a case, the substitute vehicle selection unit may be configured to select a vehicle which is optimized for solution of an interaction model using the number of changes and the additional cost as the substitute vehicle for performing the difficult-to-perform schedule.

Alternatively, from a point of view of minimizing a change in a content of the operation plan, the substitute vehicle selection unit may be configured to select a vehicle with which the number of changes of the vehicle in charge of each schedule specified in the operation plan is small, from the plurality of candidates for the substitute vehicle as the substitute vehicle for performing the difficult-to-perform schedule.

On the other hand, from a point of view of keeping the additional costs (for example, various losses such as unnecessary fuel consumption, a labor cost, a time delay, or the like) caused by changing the operation plan as low as possible, the substitute vehicle selection unit may be configured to select a vehicle from a plurality of candidates for the substitute vehicle, the additional cost of which becomes low, as the substitute vehicle for performing the difficult-to-perform schedule.

The above-described method for selecting the substitute vehicle for performing the difficult-to-perform schedule by the substitute vehicle selection unit can be switched according to the purpose, or a weight can be finely adjusted by changing a coefficient of an arithmetic expression to be used (the interaction model or the like).

In order to make it easier to visually understand the processing of determining the replanned candidate and selecting the substitute vehicle (and thus the output of the replanned plan), which tends to be complicated in the actual operation, it is desirable to have a configuration including a graph generation unit that generates a directed graph that connects a node of the vehicle specified in the operation plan and a node of the schedule assigned to each vehicle with a directed link in the order of execution.

In this case, the replanned candidate determination unit is configured to cause the graph generation unit to generate a graph as a candidate for the replanned plan by, in the directed graph, connecting the directed link from a node related to the determined candidate for the substitute vehicle toward a node of a schedule related to a replanned plan including the difficult-to-perform schedule, or a node of all planned schedules (hereinafter referred to as a schedule node).

On the other hand, the substitute vehicle selection unit is configured to cause the graph generation unit to generate a graph as a replanned plan by, in the directed graph, connecting the directed link from a node related to the selected substitute vehicle toward the schedule node.

By the above-described configuration, a user (an operator or the like) can easily visually check a vehicle breakdown, a difficult-to-perform schedule, a candidate for the substitute vehicle that performs the difficult-to-perform schedule, a current status of the selected substitute vehicle, a future plan, or the like, such that it can be expected that the replanning will smoothly proceed.

Hereinafter, each configuration described above will be described in more detail with reference to the drawings.

«Overview of Overall System»

FIG. 1 is a block diagram illustrating an example of a configuration of an information processing system according to the embodiment.

An information processing system 10 illustrated in FIG. 1 can be configured by one physical computer. Alternatively, in the information processing system 10, each component may be implemented by a separate physical computer. Instead of a computer system including one or more physical computers, the information processing system 10 may be another type of system, for example, a system (for example, a cloud computing system) implemented on a physical computing resource group (for example, a cloud infrastructure).

The information processing system 10 illustrated in FIG. 1 corresponds to the "replanned plan output device" of the present invention.

As illustrated in FIG. 1, the information processing system 10 includes an input and output support unit 20, a processing support unit 50, and an optimization calculation unit 80. Among the above-described units, the processing support unit 50 includes a calculation unit 40 and a storage unit 60.

Among the above-described units, the calculation unit 40 has a function as the above-described "replanned candidate determination unit" and the "substitute vehicle selection unit", and particularly, a planned candidate generation unit 141 which will be described later plays a role on the functions thereof.

Figure 3:
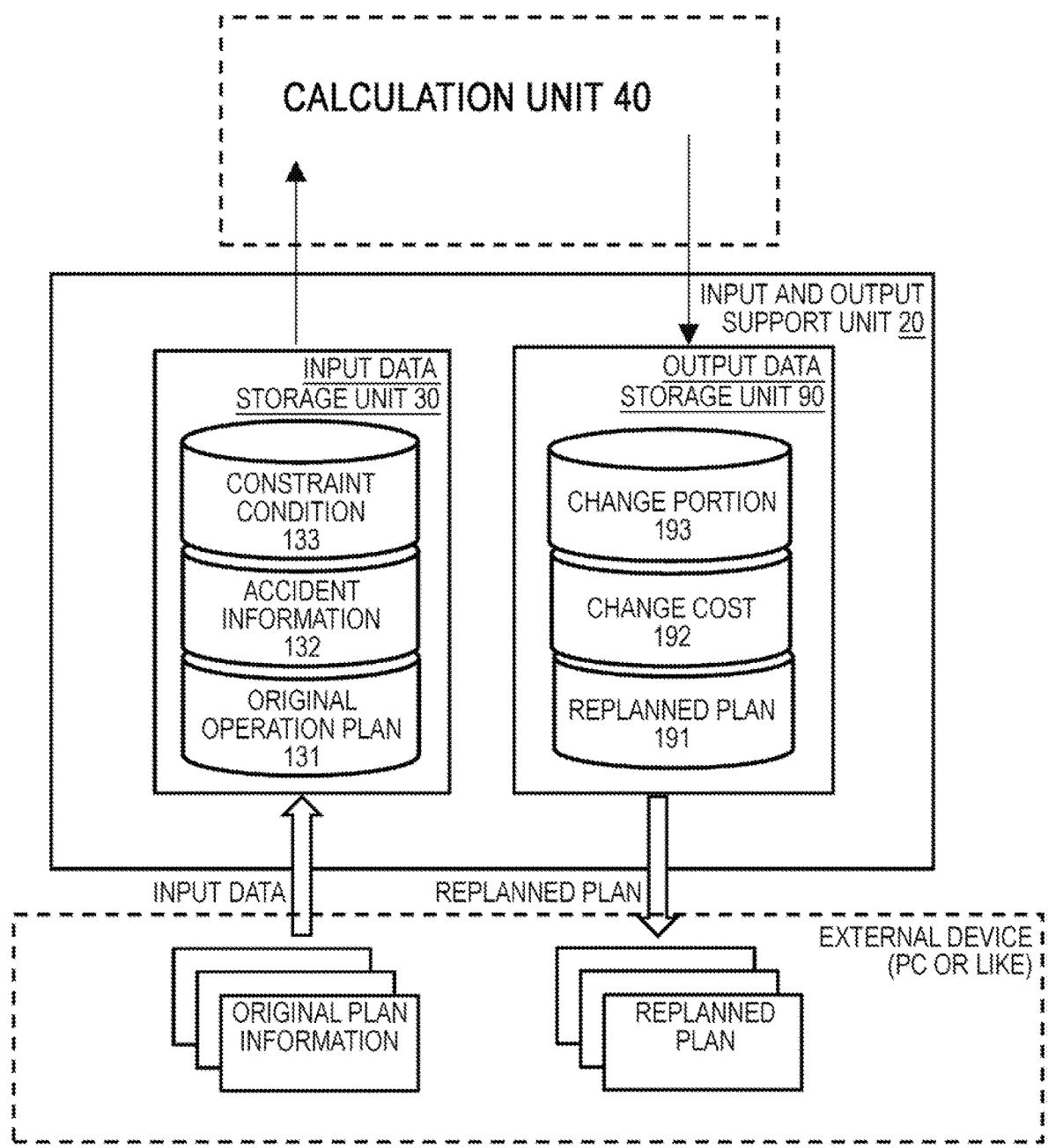
FIG. 3 is a diagram illustrating information or the like stored in an input and output support unit in the information processing system.

In the example illustrated in FIG. 1, an input and output of information with respect to the information processing system 10 is performed via the input and output support unit 20. Referring to FIG. 3, the input and output support unit 20 is connected to, for example, an input interface of an external device such as a PC or the like (an operation input unit such as a keyboard, mouse, or the like, and a communication unit such as a modem or the like), receives information input by a user via the input interface, stores the received information in an input data storage unit 30 which will be described later, and supplies the received information to the processing support unit 50.

The input and output support unit 20 is connected to, for example, an output interface of the external device such as the PC or the like (a display unit such as LCD or the like, a printing unit such as printer or the like, an external memory such as an HDD or the like, a communication unit such as a modem or the like), and can receive or visually check data of a replanned plan automatically formulated by the information processing system 10 via the output interface.

Although not illustrated in FIG. 3, the input and output support unit 20 may include a hardware processor that performs the above-described processing while communicating with the above-described external device such as the PC or the like.

Referring to FIG. 3, the input and output support unit 20 includes: the input data storage unit 30 that stores information on an originally formulated plan (hereinafter referred to as an "original plan") and an accident that occurred as input data; and an output data storage unit 90 that stores information on the replanned plan based on the original plan as output data. Details of the configuration, the information stored therein, or the like will be described later.

The optimization calculation unit 80 is implemented by using a "calculation technology dedicated to an optimization problem" such as CMOS annealing in order to process the optimization problem of the replanned plan at high speed. Here, the optimization problem indicates a problem of obtaining a value of a variable that minimizes or maximizes the cost as an evaluation value under a requested constraint. The calculation technology dedicated to the optimization problem is an ultra-high-speed dedicated simulator of an interaction model to be described in a form of the following Equation 1, such as an Ising model and a Boltzmann machine.

[Equation 1]

$$H(x) = x^T J x + h^T x \quad \text{(Equation 1)}$$

In Equation 1, x and h are vertical vectors and J is a symmetric matrix. x in Equation 1 is a variable. Since a type of the variable x depends on a property of hardware, the type of the variable x may be appropriately modeled according to the property of the hardware. A subscript T is a reference sign indicating a transposed matrix.

In Equation 1, J and h are constants, respectively. A width (a magnitude) of these constants, whether J and h are integers or real numbers, or the like also depend on the property of the hardware, and are not particularly limited. In addition thereto, a relationship with a characteristic of the embodiment is low.

In general, in a computer-related technology that exclusively calculates the optimization problem (hereinafter, may be referred to as the "calculation technology dedicated to the optimization problem"), an optimum value of the variable x is obtained by searching or reproducing a lowest energy state of the interaction model (a value of x at which a left side H of Equation 1 becomes minimum) as described in Equation 1 on the computer.

In other words, in the calculation technology dedicated to the optimization problem, calculation is performed by using an interaction coefficient of the interaction model (a value corresponding to J in Equation 1) and an external field coefficient thereof (a value corresponding to h in Equation 1) as input values, and the variable x at which H becomes minimum is calculated and output.

Returning back to FIG. 1, the optimization calculation unit 80 is an example of a parallel processing device (a device capable of performing parallel processing), and plays a role as an accelerator for solving an assignment problem by calculating the interaction model (for example, the Ising model) as described above in Equation 1.

The optimization calculation unit 80 is typically a hardware circuit such as an Application Specific Integrated Circuit (ASIC), a Field Programmable Gate Array (FPGA), or a Graphics Processing Unit (GPU).

The optimization calculation unit 80 may be implemented by a Central Processing Unit (CPU) including one or more physical or virtual cores.

Alternatively, the optimization calculation unit 80 can be, for example, a semiconductor computer (for example, a CMOS annealing machine) in which an operation of the Ising model is similarly reproduced by a semiconductor circuit (for example, a Complementary Metal Oxide Semiconductor (CMOS) circuit). The optimization calculation unit 80 may be implemented by, for example, an algorithm (for example, Momentum annealing) that operates on the GPU.

The optimization calculation unit 80 may use an annealing type quantum computer or a general-purpose type quantum computer instead of a digital computer.

In the information processing system 10 of the embodiment, the processing support unit 50 includes: the calculation unit 40 implemented on the processor; and the storage unit 60 for storing intermediate data (hereinafter, referred to as "the intermediate data" for convenience of distinction and description). A main function of the processing support unit 50 in the embodiment is to receive information input by the user, to convert the received information into an input of the optimization calculation unit 80 (the interaction model), to reconvert an output result of the optimization calculation unit 80 into a format that is easy to be seen by the user, and to return (output) the reconverted output result.

As illustrated in FIG. 1, the calculation unit 40 of the processing support unit 50 includes the planned candidate generation unit 141, a model generation unit 142, and an aggregation processing unit 143.

Among the above-described units, the planned candidate generation unit 141 generates the intermediate data serving as the planned candidate based on the input information received from the input and output support unit 20. Therefore, the planned candidate generation unit 141 may be paraphrased as an "intermediate data generation unit".

On the other hand, the model generation unit 142 calculates the interaction coefficient and the external field coefficient of the interaction model serving as the input of the optimization calculation unit 80 by using the intermediate data, and performs processing of transmitting a calculation result to the optimization calculation unit 80. The aggregation processing unit 143 generates output data by using the intermediate data and the output result of the optimization calculation unit 80, and performs processing of returning the generated output data to the input and output support unit 20.

Here, specifically, the "intermediate data" (stored in the storage unit 60) can be roughly divided into the following three types of information (60-1), (60-2), and (60-3).

(60-1) a planned candidate 161
(60-2) plan execution information 162
(60-3) change information 163

Hereinafter, specific examples of the above-described information (60-1) to (60-3) will be described.

<60-1: Planned Candidate>

In the embodiment, when the replanning is performed by using the interaction model, as a method for efficiently dealing with a complicated constraint condition, a plurality of planned candidates are generated by using a column generation method or the like (processing in the planned candidate generation unit 141). Here, the planed candidate is, for example, a candidate such as which service is to be operated by which vehicle or equipment or the like.

The planned candidate 161 is information that enumerates candidates among various candidates as described above, which satisfy a part of the requested constraints or all of the requested constraints. The planned candidate 161 is data configured with binary or integer so that the planned candidate 161 can be used directly for generating the interaction model. The planned candidate 161 can also be used as the interaction model for solving a general set covering problem and set partitioning problem.

<60-2: Plan Execution Information>

The planned candidate 161 includes, for example, pieces of information such as which service is to be operated by which vehicle or equipment, or the like, and does not include further detailed information (for example, various information required for the actual operation). This is because the planned candidate 161 is information for the purpose of calculating the coefficient of the interaction model.

In the embodiment, the information required for the actual operation is handled (handled separately) by the plan execution information 162, and this point is also one of the characteristics in the embodiment.

Specifically, for example, when a departure and arrival time of a service changes due to the replanning, the plan execution information 162 includes: the changed departure and arrival time of the service; from where to depart and where to arrive; information on the reservation when there is a reservation; and information on a size of a vehicle body and airframe required for the service operation, or the like. In general, the plan execution information 162 can be defined as "comprehensive information required to perform the replanned plan".

<60-3: Change Information>

The change information 163 is information to be introduced in order to adjust a change rate caused by the replanning, and is also one of the characteristics in the embodiment. In the embodiment, the change information 163 is numerical data having the same number of elements as that of the above-described planned candidate 161. In one specific example, the change information 163 is data that quantifies whether or not each candidate forming the planned candidate 161 deviates from the original plan, or to what extent the planned candidate 161 deviates therefrom.

The planned candidate 161, the plan execution information 162, and the change information 163 described above can be respectively stored in the storage unit 60 as database data (refer to FIG. 1).

《Embodiment of Outputting Replanned Plan of Operation Plan for the Day》

Figure 2:
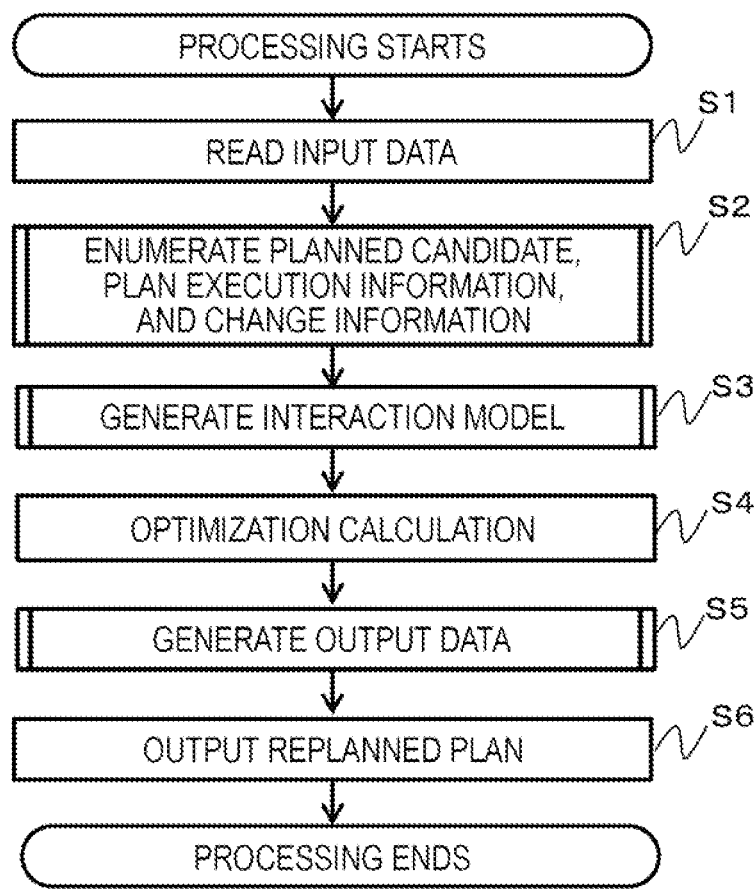
FIG. 2 is a flowchart illustrating a flow of processing of the information processing system illustrated in FIG. 1.

The following embodiment will describe a case of replanning an operation plan for the day of a fixed route bus with reference to a flowchart of FIG. 2.

The embodiment described below deals with the fixed route bus as an example, and the present invention is not construed as being limited to the following description. Therefore, for example, as another example, a vehicle of the bus to be described below may be replaced with an aircraft in aviation (a passenger aircraft or the like). As another example, a bus operation route described below may be replaced with an air flight in aviation.

The embodiment can be used in a case in which when any one or more schedules in the daily operation plan cannot be performed by the vehicle in charge due to an error such as an accident, a vehicle breakdown, or the like (when a so-called emergency occurs), it is required to replan the operation plan in real time. Alternatively, the embodiment can also be used in a case in which there is plenty of time such that real-time performance is not required, the operation plan is generated according to a certain rule determined in advance, and the operation plan is reorganized without breaking the rule as much as possible.

In the embodiment, it is assumed that it becomes difficult for one vehicle of the fixed route bus to return within the day for some reason, and a remaining vehicle (a bus) performs (performs as a substitute vehicle) a schedule planned in the operation plan for the day (the planned candidate 161 described above).

First, with reference to the flowchart illustrated in FIG. 2, an outline of a processing procedure up to the output of the replanned plan in the information processing system 10 will be described, and details of each procedure (steps S1 to S6) will be additionally described later.

In step S1, the information processing system 10 first reads input data. In one specific example, as described above in FIGS. 1 and 3, reading of the input data is implemented by reading various information on the original plan transmitted from the external device such as a PC or the like by the operation of the processor of the input and output support unit 20. As illustrated in FIG. 3, the read input data may be stored in the input data storage unit 30 such as an HDD or the like in the input and output support unit 20 so as to be classified (divided) according to a type of information. In step S1 illustrated in FIG. 2, it is assumed that the input data includes accident information which will be described later. In other words, it is not required to generate the replanned plan while the accident and the difficult-to-perform schedule do not occur.

Next, in the following step S2, the processing support unit 50 of the information processing system 10 (the planned candidate generation unit 141 illustrated in FIG. 1) enumerates each of the planned candidate, the plan execution information, and the change information described above by using the input data stored in the input data storage unit 30. At this time, as illustrated in FIG. 1, the planned candidate generation unit 141 outputs the intermediate data so that the enumerated information is classified (divided) into the planned candidate 161, the plan execution information 162, and the change information 163 according to the type of information, and stored in the storage unit 60. Further details of a processing content in step S2 will be described later in the descriptions of FIG. 6 and subsequent drawings.

Hereinafter, the planned candidate, the plan execution information, and the change information at the stage before becoming the intermediate data (the planned candidate 161, the plan execution information 162, and the change information 163) may be collectively referred to as "intermediate information".

In the next step S3, the calculation unit 40 of the processing support unit 50 calculates model generation processing, particularly, the interaction coefficient and the external field coefficient of the interaction model by using the intermediate information generated (enumerated) in the previous step. The above-described calculation is performed by the model generation unit 142 of the calculation unit 40 (refer to FIG. 1).

Further details of steps S2 and S3 will be described later.

In the following step S4, the information processing system 10 transmits the interaction model generated in the previous step from the model generation unit 142 to the optimization calculation unit 80 illustrated in FIG. 1, and the optimization calculation unit 80 performs an optimization calculation for optimizing the interaction model (for example, minimizing the cost).

In the next step S5, the optimization calculation unit 80 of the information processing system 10 transmits (sends) an output result to the aggregation processing unit 143 of the calculation unit 40 as a result of outputting the optimized (for example, minimized) solution calculated in the previous step. Next, the aggregation processing unit 143 performs aggregation processing to generate output data, and the aggregation processing unit 143 transmits (sends) the output data to the input and output support unit 20.

In a specific example of the aggregation processing, the aggregation processing unit 143 shapes the output data, that is, arranges the output data in a format that is easy to be seen by the user by using the result of the optimization calculation in step S4 (for example, the minimized solution) and the intermediate data (the planned candidate 161, the plan execution information 162, and the change information 163). As illustrated in FIG. 3, the output data storage unit 90 is provided in the input and output support unit 20, and the output data may be stored in the output data storage unit 90 so as to be classified (divided) according to a type of information (a replanned plan 191, a change cost 192, a changed portion 193 in the example illustrated in FIG. 3).

In the following step S6, the information processing system 10 outputs the replanned plan 191 in the output data storage unit 90 to the external device such as the PC or the like by the processing of the processor of the input and output support unit 20, and terminates the processing. Hereinabove, the outline of the processing performed by the information processing system 10 is described.

Hereinafter, a part of the procedure of the flowchart of FIG. 2 will be additionally described.

<1. Input and Output Data>

As an example of the input data read in step S1, the following information (30-1), (30-2), and (30-3) may be prepared as shown in the input data storage unit 30 of FIG. 3.

(30-1) Original Operation Plan 131

In the embodiment, the original operation plan 131 is information that becomes a target of the replanning (more specifically) output by the information processing system 10, and normally indicates information of the operation plan generated at the beginning (original) of formulating the plan.

(30-2) Accident Information 132

The accident information 132 includes, for example, time of occurrence of an accident or the like causing the replanning, a vehicle that cannot be operated.

(30-3) Constraint Condition 133

The constraint condition 133 includes, for example, a condition required when a normal operation plan is generated.

Next, a specific example of the "original operation plan 131" described in (1) will be described with reference to FIG. 4.

Figure 4:
FIG. 4 is a diagram illustrating an example of a daily operation plan (an original assignment plan)

As illustrated in FIG. 4, as the specific example of the original operation plan 131, a matrix type operation plan table can be used. In the example illustrated in FIG. 4, information on a schedule (a plan) of each of the vehicles 1 to 8 assigned for a specific day is recorded.

For simplification of description, FIG. 4 shows a plan in which eight vehicles are provided and each vehicle has up to 6 schedules, and actually, a plan table including information on a larger number of vehicles and a larger number of schedules for each vehicle can be generated.

For convenience of description, in the example illustrated in FIG. 4, the schedule is not assigned to the vehicle 8 which is a vehicle for accident response, and this example is not limited thereto and any schedule may be assigned to the vehicle 8. On the contrary, the number of vehicles for the accident response (vehicles to which the schedule is not assigned) may be configured to be increased.

On the other hand, when the number of vehicles to which the schedule is not assigned for the accident response are increased, it is easier to perform the calculation of the replanning, but there are other problems such as vehicle management, a standby driver, or the like. Therefore, in the embodiment, it is assumed that the original operation plan 131 is planned to eliminate or reduce the number of vehicles that are not assigned with the schedule per day as much as possible.

In the example of the original operation plan 131 illustrated in FIG. 4, the schedule corresponding to each vehicle (the vehicles 1 to 8) is represented by a table type, and this is only an example. Any configuration may be used as long as it can be known that which vehicle is in charge of which schedule. For example, as another example, data for generating an operation diagram may be used.

In other words, the numbers of schedules 1 to 24 illustrated in FIG. 4 are simply serial numbers in order to distinguish (identify) a route (from a departure place to an arrival place) of a vehicle to be operated (moves from the departure place to the arrival place) in one day.

In the example of the original operation plan 131 illustrated in FIG. 4, each schedule assigned to the vehicle number is performed in order from the schedule having the smallest number. For example, the schedule 1, the schedule 2, the schedule 3, and the schedule 4 assigned to the vehicle 1 are performed in the order of the schedules 1, 2, 3, and 4 from an aspect of operating time. For example, the schedule 4 is performed earlier than the schedules 5, 7, 9, 12, 18, and 21. As described above, an interval (for example, a driver's break time, a working time associated with a driver change, or the like) can be provided between the respective schedules (appropriately, refer to schedules 1 to 4 or the like in FIG. 7).

In the example of the original operation plan 131 illustrated in FIG. 4, in a plurality of schedules assigned to one vehicle and arranged in one row, an arrival place of a schedule n (end of a route) and a departure place of a schedule n+1 (beginning of a route) have the same relationship. For example, when an arrival place (end of the route) of the schedule 1 in the vehicle 1 is a place B, a departure place (the beginning of the route) of the schedule 2 is also the place B.

As a whole, the schedules assigned to the vehicle number (one vehicle), which are arranged in one row of the original operation plan 131 (the matrix table) illustrated in FIG. 4, represent the number of routes planned to be performed in a specific day and the order in which the schedules are planned to be performed.

On the other hand, the schedules arranged in the same column of the table illustrated in FIG. 4 are independent of each other, and have no time-related priority relationship. For example, the schedule 7 of the vehicle 3 may be performed earlier than the schedule 5 of the vehicle 2 (appropriately, refer to FIG. 7 or the like).

Based on the above description, in this specification, the "schedule" indicates the one including information at least on the operation route and operation time. In this regard, even though different terms are used depending on an industry, a trader, or the like, as long as the one including the information on the operation route and operation time is used, the one corresponds to the "schedule". A target period of the replanning is a day-to-day basis (1 day) in the embodiment, and is not limited thereto. For example, the target period thereof may be determined based on a plurality of days, a week, a month, or the like.

Next, more detailed contents of "the accident information 132" as the information of (30-2) will be described.

In one specific example, the accident information 132 is sufficient enough as long as the accident information 132 includes a vehicle that becomes inoperable and information on a number of a schedule that is not performed yet (not moved) by the vehicle in charge or time when the vehicle in charge becomes inoperable. The "time" information may be later than time when the inoperable vehicle is discovered, and any time may be sufficient enough as long as the number of the schedule not performed yet by the vehicle in charge, in other words, the schedule requiring the replanning can be specified and determined.

For convenience, the time input as the accident information will be referred to as "accident occurrence time". The inoperable vehicle to be input as the accident information will be referred to as an "accident vehicle". For the convenience of description, while the accident is used herein, a cause requiring the replanning may include a cause other than the accident, such that the cause is not limited to the accident.

Next, more detailed contents of the "constraint condition 133" as the information of (30-3) will be described. The constraint condition 133 is, for example, detailed information that is a breakdown of each schedule required to perform the operation. As illustrated in FIG. 5, the constraint condition 133 includes, for example, the departure place and the arrival place (hereinafter, the departure place and the arrival place may be collectively referred to as a "departure and arrival place"), which are the breakdown of the route (the beginning and end) of each schedule (schedules 1, 2, 3, . . . ), the departure time to depart from the departure place and the arrival time to stop (arrive) at the arrival place (hereinafter, the departure time and the arrival time may be collectively referred to as "departure and arrival time"), a type of vehicle required for the schedule, or the like.

In the following description, it is assumed that the type of vehicle is the same concept as that of a vehicle ID that identifies each vehicle, and that different vehicles are given different numbers. However, additional information may include, for example, whether the vehicle is a large vehicle or a small vehicle, the maximum number of passengers, a maximum load weight, a vehicle height, or the like. As an example of this case, the number for the vehicle type (1, 2) may be represented by adding a branch number (for example, represented as a vehicle 1-1-30, a vehicle 2-2-5, or the like).

The constraint condition 133 also includes a constraint condition required when the original operation plan is generated, in addition to the detailed information of each schedule. For example, when there are an interval time between schedules (a constraint condition in accordance with the rules such as stopping at a bus stop of a large railway station for 10 minutes or more), and a last operation time (a constraint condition such as the operation cannot be allowed after 23:00 in accordance with the rules of employment or the like), the interval time therebetween and the last operation time are input in the same manner. The constraint condition 133 may be stored in the input data storage unit 30 in advance in preparation for an accident.

On the other hand, as an example of the output data, as illustrated in the output data storage unit 90 of FIG. 3, the following information (90-1), (90-2), and (90-3) are stored therein.

(90-1) Replanned Plan 191

In the embodiment, the replanned plan 191 is information indicating one or more changed plan with respect to the original plan. A specific aspect of the replanned plan 191 will be described later in the descriptions of FIG. 7 and subsequent drawings.

(90-2) Change Cost 192

In the embodiment, the change cost 192 is information indicating the cost (loss of money, time, or the like) caused by replanning, that is, a change of the original plan, and corresponds to an "additional cost" of the present invention. The change cost 192 is shown for each replanned plan when a plurality of replanned plans are generated.

(90-3) Changed Portion 193

In the embodiment, the changed portion 193 is information indicating a changed content, that is, a difference (a changed portion) between the original operation plan 131 and the replanned plan 191. In one specific example, the changed portion 193 includes the difficult-to-perform schedule that occurred and various information related thereto (time of accident occurrence, a vehicle in which the accident occurs, a selected substitute vehicle, or the like). In this system, it is desirable that these pieces of information are output (displayed, printed, or the like) as visually understandable information, as will be described later.

Specific aspects (an output example or the like) of the output data (the replanned plan 191, the change cost 192, and the changed portion 193) will be described later in the following description of FIG. 7.

<2. Enumeration of Planned Candidates, Plan Execution Information, and Change Information>

The above-described "intermediate information" can be generated by using a method such as a column generation method or the like. Hereinafter, a procedure of generating the intermediate information and an example of a completed data format will be described. The procedure of generating the intermediate information described below is only an example, and there are no specific restrictions on a type of procedure and a type of output format for generating the intermediate information.

An example of the procedure of generating the intermediate information will be described with reference to a flowchart of FIG. 6 and a graph of FIG. 7. The flowchart illustrated in FIG. 6 corresponds to the subroutine in step S2 described above in FIG. 2.

Figure 6:
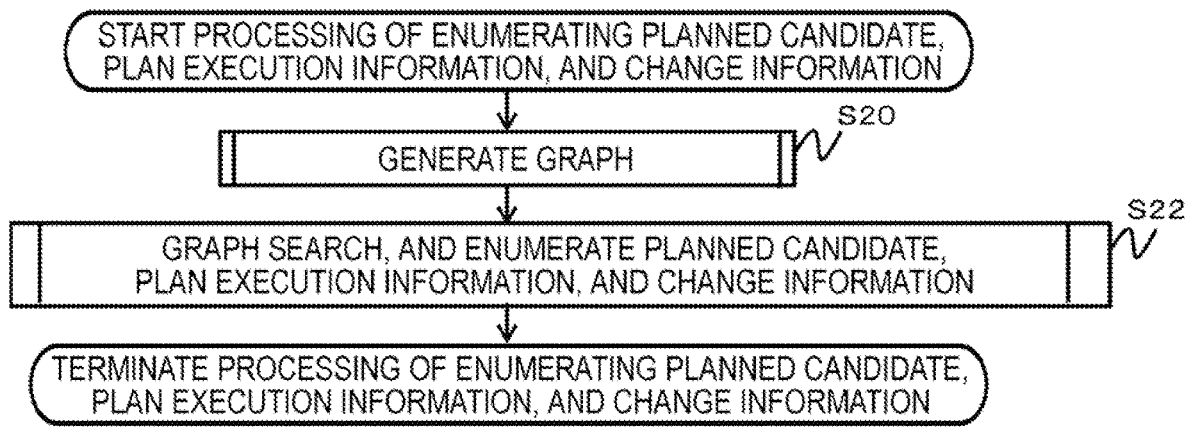
FIG. 6 is a flowchart corresponding to a subroutine in step S2 of FIG. 2.
Figure 7:
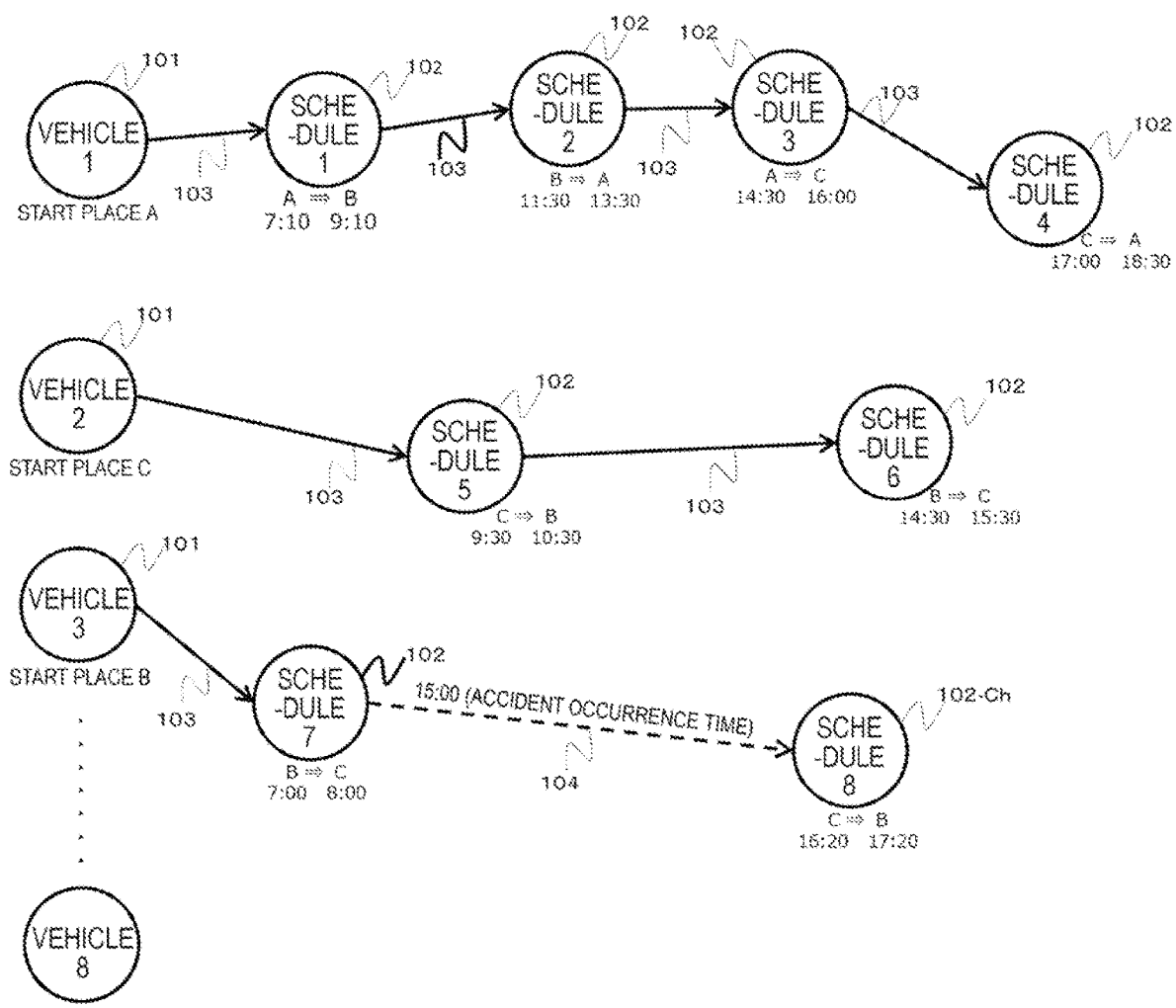
FIG. 7 is a diagram illustrating an example of a directed graph illustrating a case in which an accident occurs in a vehicle 3 in the middle of performing the operation plan and a schedule 8 becomes a difficult-to-perform schedule.

After step S1 (reading of the input data) in FIG. 2 is performed, in step S20 of FIG. 6, first, as illustrated in FIG. 7, the processor of the information processing system 10 (the planned candidate generation unit 141 in the calculation unit 40 of the processing support unit 50, and the same applies to step S22) generates data obtained by making a directed graph of a connection between each vehicle and each schedule (hereinafter, simply referred to as a "directed graph").

It can be seen that the directed graph illustrated in FIG. 7 can be generated based on the original operation plan 131 of FIG. 4 described above, the constraint condition of FIG. 5, and the accident information 132. In the example illustrated in FIG. 7, the accident information 132 indicates a case in which the vehicle 3 becomes an accident vehicle at 15:00, in other words, the schedule 8 cannot be performed by the vehicle 3.

The graph to be generated is not required to be drawn in a picture or visible form as illustrated in FIG. 7, and is sufficient enough as long as the information of the respective nodes 101 and 102 and the respective links 103 and 104 is stored in the storage unit as digital data. Continuously, the processor of the information processing system 10 adds a link (a new directed link 103-Ch which will be described later) to the directed graph generated as illustrated in FIG. 7 according to the input constraint. The above-described processing will be described later in the description of FIGS. 8 and 9.

In step S22, the processor of the information processing system 10 generates the intermediate information (the intermediate data) by performing a graph search following the added link, and the generated intermediate information (161 to 163) is saved or updated in the storage unit 60, and the processing of the flowchart of FIG. 6 is completed.

Next, a specific example of a procedure of step S20 (generation of the directed graph) and a procedure of step S22 (enumeration of the planned candidate, the plan execution information, and the change information by a route search on the directed graph), which are the subroutines of the flowchart of FIG. 6, will be described.

<2-1. Example of Directed Graph Generation Procedure>

First, an outline in the middle of generating the directed graph will be described with reference to FIG. 7.

The directed graph includes the vehicle node 101, the schedule node 102, and an arrow-shaped link (the directed link 103 or the dotted line link 104) connecting the nodes 101 and 102. The example illustrated in FIG. 7 is a graph on the assumption of a case in which eight vehicles of the vehicles 1 to 8 are used to perform 24 schedules of the schedules 1 to 24 according to the original operation plan 131 described in FIG. 4 and the constraint condition 133 described in FIG. 5.

However, in order to avoid complicated description, in FIG. 7, the vehicle nodes 101 of the vehicles 4 to 7 and the schedule nodes 102 of the schedules 9 to 24 of the original operation plan 131 assigned to the vehicles 4 to 7 are omitted.

In the embodiment, the directed link 103 is used as an arrow from the vehicle node 101 to the schedule node 102, or is used as an arrow from one schedule node 102 to another schedule node 102 (the later schedule node 102 that does not overlap in time).

The directed link 103 is not connected between the vehicle nodes 101, and a length of the directed link 103 has no technical meaning.

The basic significance of the directed link 103 described above is the same for the dotted line link 104 to be used when the accident occurs.

A difference between the directed link 103 and the dotted line link 104 is that when the accident occurs in any one of the vehicles specified in the original operation plan 131, the dotted line link 104 is used as an arrow directed toward the schedule node 102, which is not performed yet, of the vehicle node 101 and the respective schedule nodes 102 assigned to the accident vehicle.

In the same manner as that of the directed link 103, the dotted line link 104 is not connected between the vehicle nodes 101, and in addition thereto, a length of the dotted line link 104 has no technical meaning.

In the above description, a form of the "arrow directed toward the schedule node 102 that is not performed yet" of the dotted line link 104 can be roughly classified into the following accident examples 1 to 3.

Accident example 1: In the case of an arrow directed from the vehicle node 101 of the accident vehicle to all the schedule nodes 102 to be performed by the vehicle (a case in which since the accident occurs from the departure time, the dotted line link 104 is connected from the vehicle node 101 of the accident vehicle to all of the first schedule node 102, and the last schedule node 102).

Accident example 2: a case in which since the vehicle becomes the accident vehicle after performing any one of the schedules, the dotted line link 104 is connected between the schedule nodes 102 from the performed schedule node 102 to the next schedule node 102 and the last schedule node 102, which can follow the link from the vehicle node.

Accident example 3: a case in which since the vehicle becomes the accident vehicle in the middle of performing the last schedule or after performing a previous schedule of the last schedule, the dotted line link 104 is connected from the performed schedule node 102 to the last schedule node 102.

In general, an amount required to change the content of the original operation plan 131 (refer to FIG. 4) (in other words, an amount of data of the change information 163) is increased in the order of the accident example 3, the accident example 2, and the accident example 1, and in order to avoid complicated description, generation of the directed graph on the assumption of the case of the accident example 3 will be described below.

Figure 8:
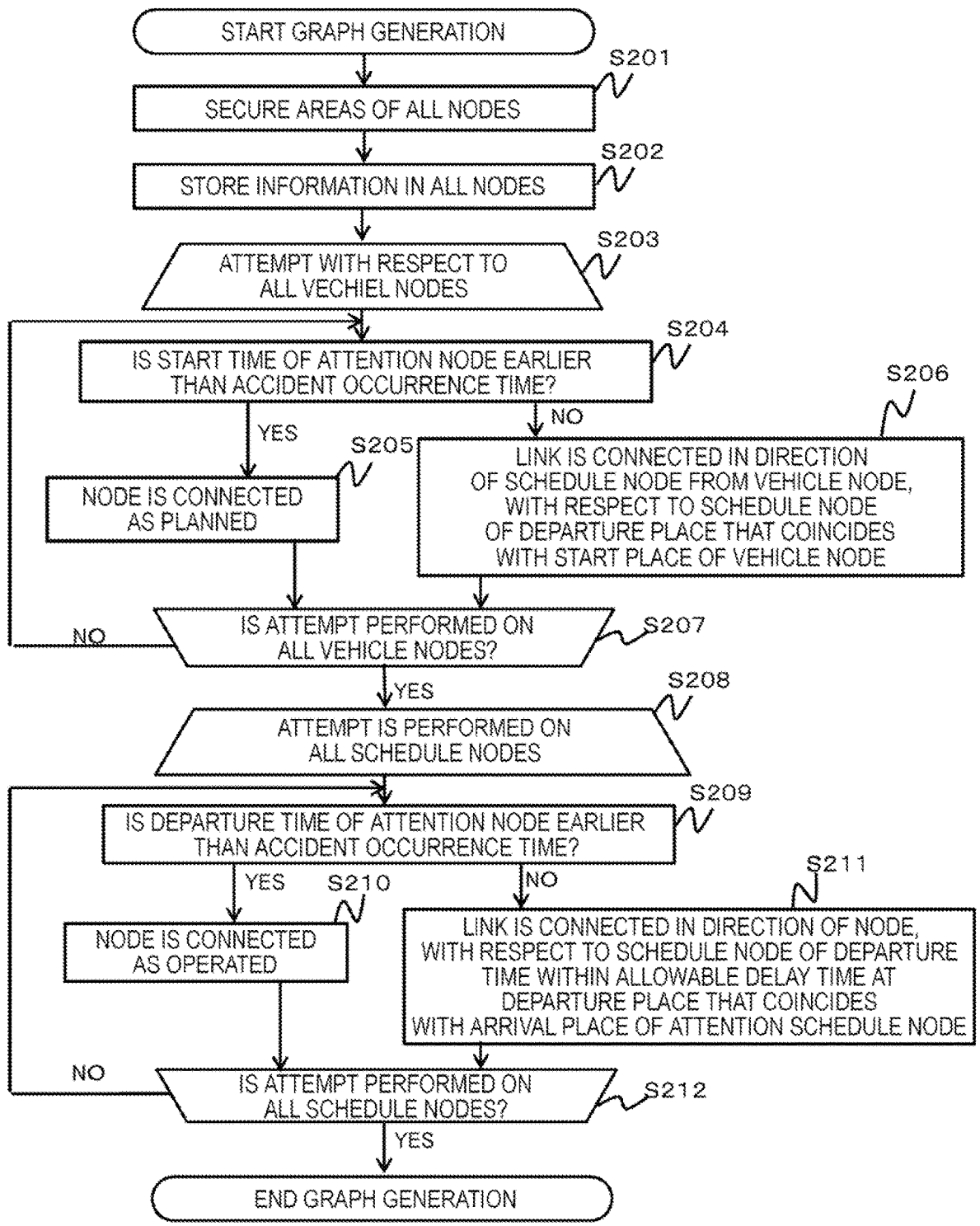
FIG. 8 is a flowchart illustrating an example of a processing flow for generating various directed graphs.

FIG. 8 illustrates a flowchart showing a procedure in which the directed graph illustrated in FIG. 7 is generated according to the original operation plan 131, the accident information 132, and the constraint condition 133 described above, and then a graph as illustrated in FIG. 9 (hereinafter referred to as a "change candidate graph") is generated based on the directed graph.

In step S201, the processor of the information processing system 10 (the planned candidate generation unit 141 of the calculation unit 40) secures a data storage area corresponding to all the nodes (the vehicle node 101 and the schedule node 102) specified in the original operation plan 131. This area can be secured, for example, by securing the data storage area for the planned candidate 161, the plan execution information 162, and the change information 163 in the storage unit 60.

Continuously, in step S202, the planned candidate generation unit 141 (the processor, the same applies hereinafter) stores (inputs) the corresponding information with respect to all the nodes (same as above). Specifically, the planned candidate generation unit 141 stores necessary information such as the start time, the departure place, the vehicle information, or the like of the original plan read from the input data in a storage area corresponding to each vehicle node 101. The planned candidate generation unit 141 stores necessary information such as the departure and arrival place, the departure and arrival time, the operation condition, or the like of the original plan read from the input data (refer to step S1 in FIG. 2) in a storage area corresponding to each of the schedule nodes 102 and 105. The planned candidate generation unit 141 performs processing of connecting the corresponding link (the directed link 103 or the dotted line link 104) to all the nodes (same as above), based on the accident information 132 and the constraint condition 133 read from the input data.

By performing the processing of steps S201 and S202 described above, it is possible to generate the data corresponding to the directed graph described above in FIG. 7. In other words, steps S201 and S202 correspond to the subroutine of step S20 illustrated in FIG. 6.

Referring back to FIG. 7, it can be seen that in the directed graph generated at this point, each schedule node 102 includes information on the departure and arrival place and the departure and arrival time in accordance with the input data (the constraint condition 133 described above in FIG. 5).

For example, the schedule node 102 corresponding to the schedule 1 is a schedule in which a vehicle departs from a bus stop A (a node start end) at 7:10 and arrives at a bus stop B (a node rear end) at 9:10, and is a schedule assigned to the vehicle 1. The schedule node 102 corresponding to the schedule 2 is a schedule in which the vehicle 1 departs from a bus stop B (a node start end) at 11:30 and arrives at a bus stop A (a node rear end) at 13:30. The same also applies to steps 3 and 4 continuously performed by the vehicle 1. The directed link 103 is connected so that a plurality of nodes 101 (the vehicle 1) and 102 (the schedule 1) to 102 (the schedule 4) are connected one-to-one in chronological order.

Next, the directed graph illustrated in FIG. 7 illustrates the case in which the vehicle 3 becomes the accident vehicle at 15:00 after performing the schedule 7 according to the accident information 132 in the input data. Therefore, the schedule node 102 of the schedule 8 that requires a change in the assignment of the vehicle is indicated by a reference sign 102-Ch, and the schedule node 102 of the schedule 7 and the schedule node 102 (102-Ch) of the schedule 8 are connected by the dotted line link 104.

In other words, the schedule node 102-Ch (only the schedule 8 in FIG. 7) is a schedule that is planned to be performed by the vehicle 3 in the original plan but cannot be performed by the vehicle 3 due to the accident occurrence in the vehicle 3, and corresponds to the "difficult-to-perform schedule" of the present invention.

It can be said that the dotted line link 104 is a link for a schedule for which a link is supposed to be connected according to the original plan and which may not be performed due to the accident occurrence. In other words, it can also be said that in the original plan, the directed link 103 is planned to be connected between the schedules 7 and 8, but the directed link 103 is not actually connected therebetween and the dotted line link 104 (indicating that the schedule 8 cannot be performed by the vehicle 3) is in a state of being connected therebetween instead. Thus, in the example illustrated in FIG. 7, the schedule node 102-Ch of the schedule 8 (the difficult-to-perform schedule) that cannot be performed by the vehicle 3 is required to be connected to the directed link 103 from the node (the vehicle node 101 or the schedule node 102) assigned to any other vehicles (the vehicles 1, 2, 4 to 8 in this example), and is required to be performed by the other vehicle.

Figure 9:
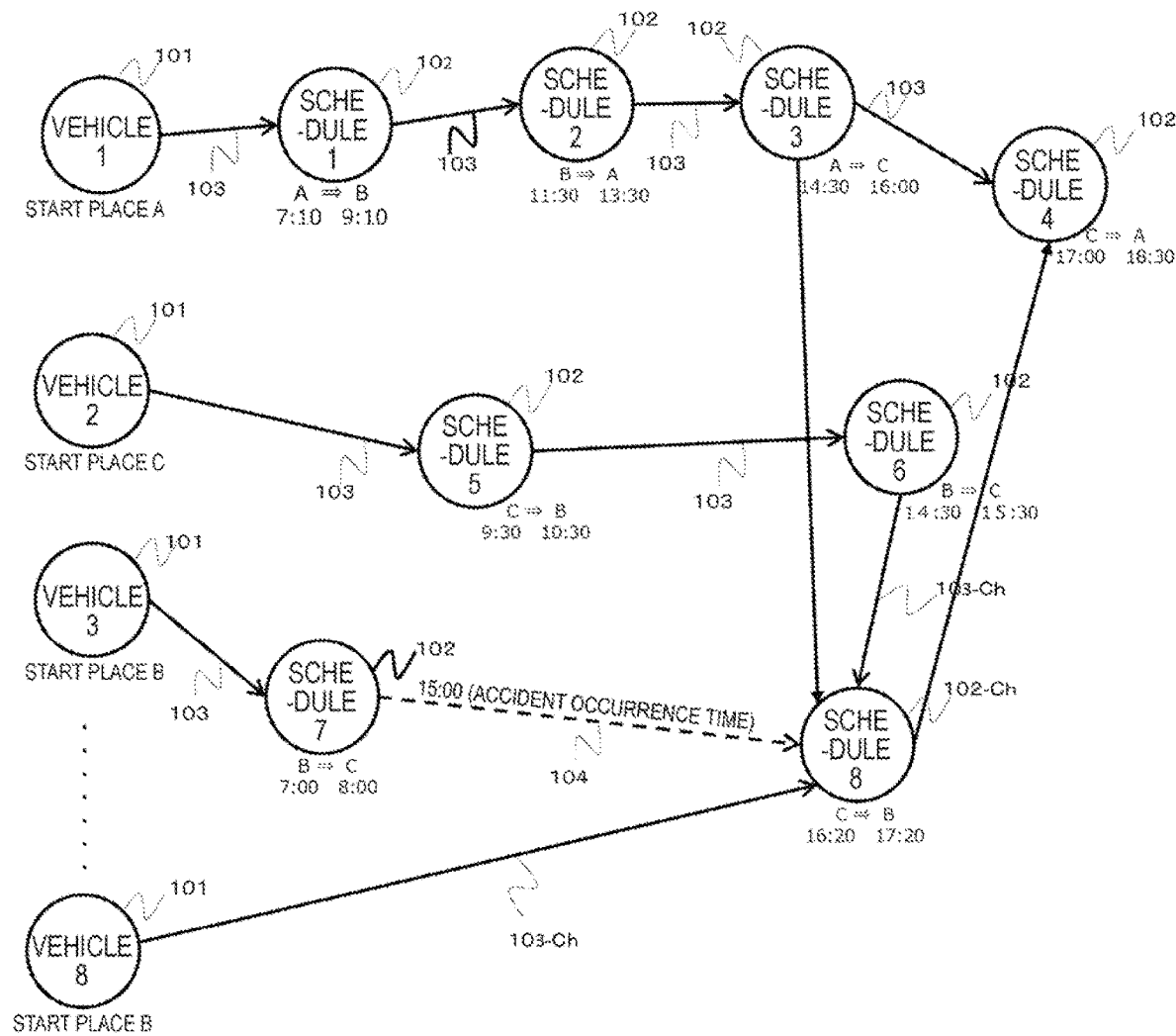
FIG. 9 is a directed graph (a change candidate graph) illustrating a state in which a replanned candidate and a route candidate are generated based on the directed graph illustrated in FIG. 7.

Continuously, processing from steps S203 to S212 in the flowchart of FIG. 8 will be described. The processing corresponds to processing up to generation of the change candidate graph as illustrated in FIG. 9 based on the directed graph illustrated in FIG. 7. In FIG. 8, this processing can be implemented by first performing only a loop passing through step S205 in a branch at step S204 to generate the graph of FIG. 7, and then by performing a loop passing through step S206.

When both steps S205 and S206 are processed at the same time, the graph in a state of FIG. 9 can be generated without generating a state of FIG. 7.

In one specific example, the planned candidate generation unit 141 performs processing of connection attempt of the following directed link 103 (steps S203 to S207), with respect to the vehicle nodes 101 of all the vehicles (the vehicles 1, 2, 4 to 8 in this example) other than the accident vehicle.

First, in step S203, the planned candidate generation unit 141 sets the vehicle node 101 of one vehicle (for example, the vehicle 1) as an implementation target (hereinafter, the one vehicle node 101 is referred to as an "attention node").

In the following step S204, the planned candidate generation unit 141 determines whether or not the start time of the attention node is earlier than the accident occurrence time (15:00 in this example).

As a result of the above-described determination, when the start time thereof is earlier than the accident occurrence time (step S204, YES), the planned candidate generation unit 141 determines that link connection therebetween cannot be performed, and proceeds to step S205.

On the other hand, as a result of the above-described determination, when the start time thereof is not earlier than the accident occurrence time (step S204, NO), the planned candidate generation unit 141 determines that the link connection therebetween can be performed, and proceeds to step S206.

In step S205, the planned candidate generation unit 141 maintains a state in which the directed link 103 is connected in a direction of the schedule, which is the first schedule to be performed by the vehicle in charge (for example, the schedule node 102 of the schedule 1 when the attention node is the vehicle 1), as originally planned, and proceeds to step S207.

On the other hand, in step S206, the planned candidate generation unit 141 performs setting of connecting the directed link 103-Ch (appropriately, refer to FIG. 9) from the vehicle node 101 of the attention node to the schedule node 102-Ch (of the schedule 8 which may not be performed) which becomes a connection destination of the above-described dotted line link 104, and proceeds to step S207.

In step S207, the planned candidate generation unit 141 determines whether or not an attempt is performed to connect the directed link 103-Ch from the vehicle nodes 101 of all the vehicles other than the accident vehicle (the vehicles 1, 2, 4 to 8 in this example) to the schedule node 102-Ch.

As a result of the above-described determination, when the connection attempt is not performed yet on the vehicle nodes 101 of all the vehicles other than the accident vehicle (step S207, NO), the processing returns to step S203, and the planned candidate generation unit 141 pays attention to the vehicle node on which the connection attempt is not performed, and repeats the processing of steps S204 to S207 described above.

On the other hand, when it is determined that the connection attempt is performed on the vehicle nodes 101 of all the vehicles other than the accident vehicle (step S207, YES), the planned candidate generation unit 141 proceeds to step S208.

In this example, by performing the above-described processing, as illustrated on a lower side in FIG. 9, the directed link 103-Ch is connected from the vehicle node 101 of the so-called emergency standby vehicle 8 to the schedule node 102-Ch of the schedule 8.

However, since the vehicle 8 is located at the place B when the accident of the vehicle 3 occurs (refer to FIG. 9), first, it is required for the vehicle 8 to move to the place C in order to perform the schedule 8.

In step S208, the planned candidate generation unit 141 performs processing of the connection attempt of the following directed links 103, with respect to all the schedule nodes (the schedule nodes 102 other than the schedule node 102-Ch indicated by the dotted line link 104, the same applies hereinafter) (steps S208 to S212).

In step S208, the planned candidate generation unit 141 sets the schedule node 102 of one schedule (for example, the schedule 1) as an implementation target (similarly to the above description, the one schedule node 102 is referred to as an "attention node").

Continuously, in step S209, the planned candidate generation unit 141 determines whether or not the departure time of the attention node is earlier than the accident occurrence time (15:00 in this example).

As a result of the above-described determination, when the departure time thereof is earlier than the accident occurrence time (step S209, YES), the planned candidate generation unit 141 determines that the link connection cannot be performed, and proceeds to step S210.

On the other hand, as a result of the above-described determination, when the departure time thereof is not earlier than the accident occurrence time (step S209, NO), the planned candidate generation unit 141 determines that the link connection can be performed, and proceeds to step S211.

In step S210, the planned candidate generation unit 141 maintains a state in which the directed link 103 is connected to the schedule (for example, the schedule node 102 of the schedule 2 when the attention node is the schedule 1) as originally planned, and proceeds to step S212.

On the other hand, in step S211, the planned candidate generation unit 141 performs setting of connecting the directed link 103-Ch (appropriately, refer to FIG. 9) from the schedule node 102 of the attention node to the schedule node 102-Ch (of the schedule 8 which may not be performed) which is the connection destination of the above-described dotted line link 104, and proceeds to step S212. Here, a "delay allowable time" of FIG. 8 will be described. For example, in the example of the original plan illustrated in FIGS. 7 and 9, the departure time of the schedule 6 is 14:30 and the arrival time thereof is 15:30, such that when a link is connected from the schedule 6 to the schedule 8 (the departure time is 16:20, the arrival time is 17:20) and the connected link is used as the replanned plan, the schedule 8 can be performed without changing the time. However, when the arrival time of the schedule 6 is planned to be later than the departure time of the schedule 8, for example, the departure time of the schedule 6 is 15:30, and the arrival time thereof is 16:30, and a replanned plan from the schedule 6 to the schedule 8 is intended to be formulated, the departure time of the schedule 8 should be reset after 16:30. If the interval time is 5 minutes, the departure time of the schedule 8 becomes 16:35, thereby formulating the replanned plan that is 15 minutes later than the original plan. The extent to which this delay time is allowed will be referred to as an allowable delay time here. The allowable delay time varies depending on a vendor, such that the allowable delay time is set as necessary.

In step S212, the planned candidate generation unit 141 determines whether or not an attempt is performed to connect the directed link 103-Ch to all the schedule nodes 102.

As a result of the above-described determination, when the connection attempt is not performed yet on all the schedule nodes 102 (step S212, NO), the planned candidate generation unit 141 returns to step S208, pays attention to the schedule node 102 on which the connection attempt is not performed, and repeats the processing of steps S209 to S212 described above.

On the other hand, when it is determined that the connection attempt is performed on all the schedule nodes 102 (step S212, YES), the planned candidate generation unit 141 ends the routine of FIG. 8.

In this example, as illustrated on a right side in FIG. 9, by performing the above-described steps S208 to S212, the directed link 103-Ch is connected from the schedule node 102 of the schedule 6 to the schedule node 102-Ch of the schedule 8.

By performing such a series of processing, in the information processing system 10, the graph as illustrated in FIG. 9, that is, the change candidate graph in which the directed link 103-Ch as a change candidate (hereinafter, also referred to as a "change candidate link") is connected is generated.

<2-2. Example of Procedure for Enumerating Intermediate Data by Graph Search>

Next, an example of a procedure for generating the change information 163 of the above-described intermediate data after generating the change candidate graph as described above in FIG. 9 will be described. The change information 163 can be generated in the middle of performing the graph search according to a certain rule along the link on the change candidate graph illustrated in FIG. 9.

Figure 10:
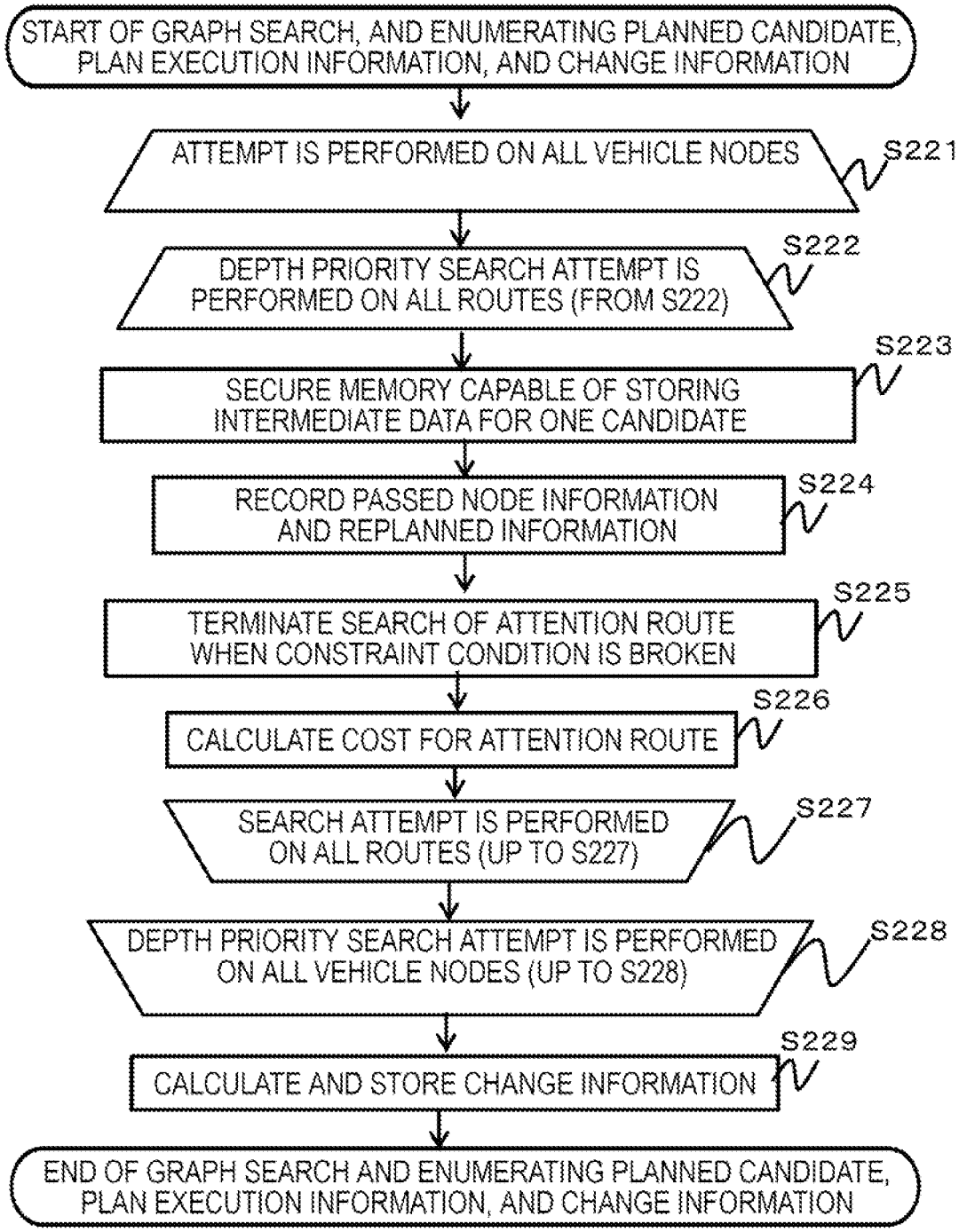
FIG. 10 is a flowchart corresponding to a subroutine in step S22 of FIG. 6.

An example of this graph search procedure is illustrated in a flowchart of FIG. 10. Before describing details of the flowchart of FIG. 10, first, an outline of generating the intermediate data from the graph search will be described with reference to FIGS. 11 and 12.

Figure 11:
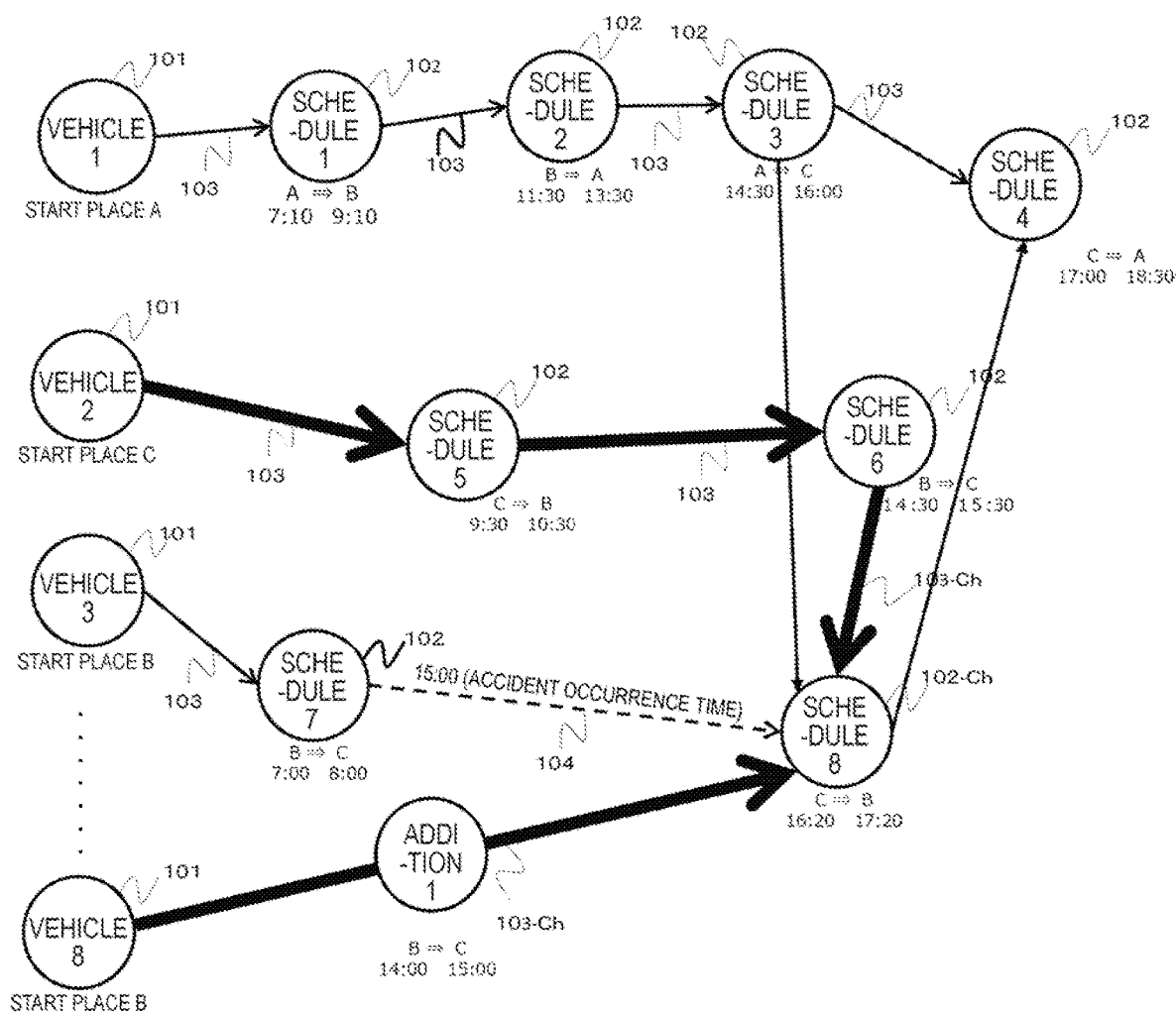
FIG. 11 is a directed graph illustrating a difference in the number of changes, an additional cost, or the like between two types of replanned candidates (the route candidates)

Here, FIG. 11 illustrates a change candidate graph similar to the graph illustrated in FIG. 9, and the directed link 103 and the change candidate link 103-Ch related to the processing are highlighted with a thick line. In FIG. 11, on the directed link 103-Ch connected from the vehicle node 101 of the vehicle 8 to the schedule node 102-Ch of the schedule 8, an additional schedule (a schedule node indicated by "addition 1" in the drawing) for causing the vehicle 8 to move from the place B to the place C is inserted.

On the other hand, FIG. 12 is a table illustrating an example in which the original plan and the plan of the change candidate are represented by a binary value of 0/1. For reference and ease of understanding, columns from left to third in FIG. 12 (that is, the columns of planned candidates j=1, 2, 3, and particularly the column of j=3) indicate a binary value when each schedule (in this example, the schedule 1 to the schedule 8) is performed as originally planned.

A row forming a node number i of the table illustrated in FIG. 12 (hereinafter, may be referred to as a "planned candidate table") corresponds to each node (the vehicle node 101 and the schedule node 102) of the change candidate graph illustrated in FIG. 11, and the column forming the planned candidate j of the table starts with the vehicle node 101 as the start of the graph, and corresponds to a route (a route along which movement has already been made or movement will be made) that is connected according to the rules described above (the end and the next start are the same).

The value (the binary number) stored in each field of the table in FIG. 12 is determined by a rule in which the value is set to 1 when the route shown in each column (the planned candidate j) passes through the node shown in each row, and the value is set to 0 when the route does not pass therethrough, and stored therein.

However, the schedule 8 (i=16) in the column of the planned candidate j=3 shown for reference is shown in parentheses and with underlined 1 because the schedule 8 cannot be actually performed.

The column of the planned candidate j can also be generated for each route (the node number i).

With reference to FIGS. 12 and 11, a plan content in a route following the change candidate link 103-Ch related to the vehicle 2 on the change candidate graph illustrated in FIG. 11 can be represented as a column shown in the planned candidate j=4 in FIG. 12.

On the other hand, a plan content in a route following the change candidate link 103-Ch related to the vehicle 8 on the change candidate graph illustrated in FIG. 11 can be represented as a column shown in the planned candidate j=5 in FIG. 12.

In general, the value of 0/1 (the binary number) in each field in the table of FIG. 12 is an element forming the planned candidate 161 which is one of the above-described intermediate data.

For example, as shown by the thick line at a position in the middle of the graph illustrated in FIG. 11, there is a route that starts from the vehicle node 101 of the vehicle 2 and follows a route (the thick line) in the order of the schedule 5, the schedule 6, and the schedule 8. The above-described route becomes a value of a column j=4 in the change candidate table of FIG. 12. The value (the binary value) in each field of the column of j=4 corresponds to a value indicating a first change candidate.

Specifically, since the route starts from the vehicle 2 and passes through the schedules 5, 6 and 8, in the column of j=4 (the first change candidate), a row of the vehicle 2 and the schedules 5, 6 and 8 becomes 1, and the rest thereof becomes 0. The route in the column of j=4 (the first change candidate) corresponds to the candidate for the operation plan of the vehicle 2 after the replanning.

On the other hand, as illustrated by a thick line at a lower position of the graph illustrated in FIG. 11, there is a route that starts from the vehicle node 101 of the vehicle 8 and follows a route (the thick line) in the order of the additional schedule 1 and the schedule 8. The above-described route becomes a value of a column of j=5 in the change candidate table of FIG. 12. The value (the binary value) in each field of the column of j=5 corresponds to a value indicating a second change candidate.

Specifically, since the route starts from the vehicle 8 and passes through the additional schedule 1 and the schedule 8, in the column of j=5 (the second change candidate), a row of the vehicle 8, the addition 1, and the schedule 8 becomes 1, and the rest thereof becomes 0. The route in the column of j=5 (the second change candidate) corresponds to the candidate for the operation plan of the vehicle 8 after the replanning.

Next, the change candidate table as illustrated in FIG. 12 can be generated simultaneously and in parallel by the processor (the planned candidate generation unit 141) of the information processing system 10 when the change candidate graph of FIG. 11 is generated.

The processor (the planned candidate generation unit 141) of the information processing system 10 calculates a cost for each route (the node number i) and the planned candidate (j) described above, calculates an additional cost ($C_j$) for each planned candidate j, and stores the calculated value in the table.

In one specific example, the planned candidate generation unit 141 calculates an evaluation value corresponding to a loss incurred by a user, such as an amount of loss when a delay occurs due to a change of the plan (for example, O yen per minute of delay time) or the like, as the additional cost, and stores the evaluation value in the table. The planned candidate generation unit 141 may calculate, as the additional cost, an evaluation value corresponding to a fuel cost, a labor cost, or the like which are unnecessarily generated by a change of the route, and may store the evaluation value in the table.

For example, routes in the columns of j=1 and j=2 have the same contents as originally planned, such that the additional cost does not occur. On the other hand, a route in the column of j=3 incurs cost such as repair or the like when the vehicle 3 breaks down, but a value of 0 or null is stored because it is considered that the additional cost caused by the change of the plan does not occur yet.

On the other hand, in a route of the column of j=4 (the first change candidate), the vehicle 2, as a substitute vehicle, performs the schedule 8 which is originally supposed to be performed by the vehicle 3 as compared with the route of the column of j=2, the cost of fuel consumption or the like of the vehicle 2 increases, and it is considered that there is no loss incurred by the user because the schedule 8 can be performed without the delay time. Therefore, 0.1 is calculated and stored in the table as the additional cost ($C_j$) of the column of j=4.

On the other hand, in the route of the column of j=5 (the second change candidate), since it is required to substantially perform two schedules (the additional schedule 1 and the schedule 8) when the vehicle 8, as a substitute vehicle, performs the schedule 8, the cost of fuel consumption increases and the personnel cost also increases as compared with the case in which the vehicle 2, as a substitute vehicle, performs the schedule 8. On the other hand, in this case as well, it is considered that there is no loss incurred by the user because the schedule 8 can be performed without the delay time. Therefore, 0.5 is calculated and stored in the table as the additional cost ($C_j$) of the column of j=5.

Thus, the processor (the planned candidate generation unit 141) of the information processing system 10 determines which change candidate is adopted as the changed plan in consideration of the additional cost (C) calculated for each change candidate and the substantial number of schedules to perform the schedule 8 (corresponding to the "number of changes" of the present invention).

Figure 13:
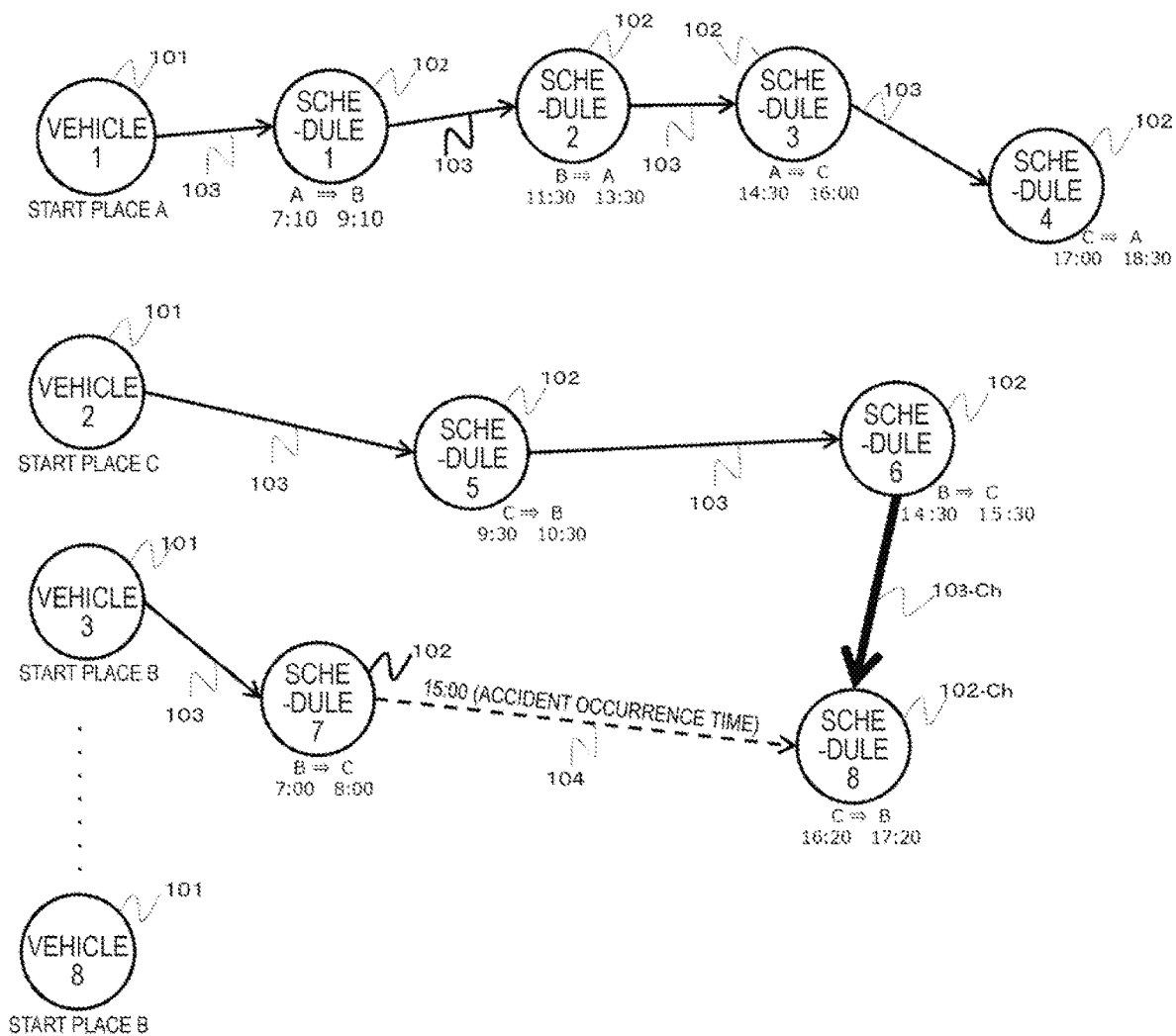
FIG. 13 is a directed graph illustrating an example of a processed planned candidate, plan execution information, and change information.

In this example, the route of the column of j=4 (the first change candidate) has smaller both the additional cost ($C_j$) and the substantial number of schedules to perform the schedule 8 than those of other routes. Therefore, the processor (the planned candidate generation unit 141) of the information processing system 10 adopts the route of the column of j=4 (the first change candidate) as the changed plan. The directed graph after adopting the route of the column of j=4 is illustrated in FIG. 13.

In other words, by performing the above-described processing, processing of selecting the vehicle 2 corresponding to the first change candidate from a plurality of candidates for the substitute vehicle (the vehicle 2 and the vehicle 8 in this example) as a substitute vehicle for the schedule 8 (the difficult-to-perform schedule) is performed (the function of the substitute vehicle selection unit).

At this time, the processor (the planned candidate generation unit 141) of the information processing system 10 can also generate the plan execution information 162 and the change information 163 described with reference to FIG. 1. As described above, in FIGS. 9 and 11 or the like, the drawing (the graph) is drawn to be visually recognized for description, and in the implementation of the present invention, it is not necessarily required to generate the graph to search for the link.

The change information 163 is data for distinguishing between a schedule that is changed from the original plan and a schedule that is not changed therefrom, among the planned candidates 161. As an example, the data in which the values in the table illustrated in FIG. 15 are stored can be used. FIG. 13 includes the change information when the substitute vehicle is finally selected in the accident occurrence case described in FIG. 7. Here, the planned candidates j=1, j=2, and j=3 illustrated in FIG. 12 are the original plan, the planned candidates j=4 and j=5 are candidates for the change plan, and the planned candidate j=4 is the plan in which the substitute vehicle is selected. In the example illustrated herein, a change that causes a delay does not occur because the plan is simple, and as described above, it is also possible to formulate a plan in which the departure time and the arrival time are changed within a range of the allowable delay time.

Step S22 schematically described in FIG. 6, that is, an example of a procedure for the directed graph search, and enumerating the planned candidate, the plan execution information, and the change information, is illustrated in the flowchart of FIG. 10. Unless otherwise specified, the processing continuously proceeds in the order of numbers.

In step S221, the processor (for example, the planned candidate generation unit 141, the same applies hereinafter) of the information processing system 10 attempts to perform the following steps S222 to S228 with respect to all the vehicle nodes 101 (in this example, the vehicle nodes 101 of the vehicles 1 to 8).

In step S222, the processor of the information processing system 10 starts with the attention vehicle node 101 and performs a depth priority search for all routes. For example, based on the change graph illustrated in FIG. 13, the vehicle 1 becomes a "depth 4" in consideration of the schedule 1, the schedule 2, the schedule 3, and the schedule 4. Similarly, the vehicle 2 becomes a "depth 3", the vehicle 3 becomes a "depth 1" (due to the accident occurrence), and the vehicle 8 becomes a "depth 0" (because the vehicle 8 is determined not to be operated).

In step S223, the processor of the information processing system 10 secures a necessary memory area for the intermediate data (for example, one column of the table in FIG. 10 and the table in FIG. 11) for one candidate of the operation plan of the attention vehicle.

In step S224, the processor of the information processing system 10 records information on the passed node (the schedule that is already performed). For example, when an interval is set because the end of the schedule is a major train station or the like such that a constraint condition is imposed on the departure time of the next schedule, the departure and arrival time is adjusted and stored in the plan execution information 162 as time after replanning. By performing such processing, the response to the occurrence of the accident vehicle (the difficult-to-perform schedule) can be smoothly performed.

In step S225, the processor of the information processing system 10 determines whether or not a rule determined by the constraint condition is broken. When it is determined that the rule is broken (step S225, YES), the processor of the information processing system 10 terminates a search for the route of the attention vehicle. Here, cases where it is determined that "the rule is broken" include a case where the maximum number of schedules is exceeded, a case where the arrival time after replanning exceeds the final time, or the like.

In step S226, the processor of the information processing system 10 calculates and stores the cost of the attention route according to a calculation method determined by the user.

In step S227, the processor of the information processing system 10 determines whether or not a search attempt for all the routes is completed. When it is determined that the search attempt therefor is completed (step S22, YES), the processor of the information processing system 10 proceeds to step S228. On the other hand, when it is determined that the search attempt for all the routes is not completed yet (step S227, NO), the processor of the information processing system 10 returns to step S223 in order to select a route on which the search attempt is not performed, and repeatedly performs the processing from step S223 described above.

In step S228, the processor of the information processing system 10 determines whether or not a depth priority search attempt for all the vehicle nodes is completed. When it is determined that the depth priority search attempt is completed (step S228, YES), the processor of the information processing system 10 proceeds to step S229. On the other hand, when it is determined that the depth priority search attempt for all the vehicle nodes is not completed yet (step S228, NO), the processor of the information processing system 10 returns to step S221 in order to focus on a vehicle node on which the depth priority search attempt is not performed.

In step S229, the processor of the information processing system 10 calculates and stores the change information 163 according to a predetermined rule, and terminates a series of processing.

<3. Model Generation>

The above-described example is described on the assumption that a relatively simple case is used for ease of understanding. In the actual operation, it may be required to change the original operation plan in a more complicated form and operate the changed operation plan. Therefore, in the information processing system 10 of the embodiment, the optimization calculation unit 80 is provided, and the above-described processing related to the candidate determination and selection of the substitute vehicle can be performed by using a method for calculating an optimum solution of the interaction model.

Here, the interaction model solved by the optimization calculation unit 80 is generated by using the planned candidate 161 and the change information 163 described above. The following embodiment describes an example of an interaction model that can be considered based on a set partitioning problem (a mathematical model of an equation constraint of Equation 2). The model shown here is only one form of the embodiment, and is not limited to a form of the set partitioning problem. Depending on a method for generating the planned candidate, the method can be considered based on a set covering problem (an inequality constraint of Equation 2), or can be established by a completely different formulation.

In the general set partitioning problem, for example, a binary variable x determines which combination of the columns j of the planned candidates 161 such as the data in the table of FIG. 12 is selected. Specifically, $x_j=1$ is obtained when the planned candidate in the column j is selected, and $x_j=0$ is obtained when not selected. The actual replanned plan is the one that takes out only a route where x=1. In the example of FIG. 14, $A_{ij}$ of Equation 2 shown below is a matrix of binary values of 0/1 surrounded by a thick frame 401.

[Equation 2]

$$\text{Objective function}: \min \sum_{j=1}^{N} C_j x_j$$

$$\text{Constraint condition}: \sum_{i=1}^{M} A_{ij} x_j \geq b$$

$$x_j \in \{0, 1\}$$

(Equation 2)

In the Equation 2, $C_j$ is a cost which is a value of a portion surrounded by a thick frame 402 in FIG. 14. In Equation 2, M is the number of rows, and in the example of FIG. 14, M=11. N in Equation 2 is the number of columns (that is, the number of planned candidates), and in the example of FIG. 14, M=8.

The interaction model input to the optimization calculation unit 80 can be simply described as the following Equation 3 in the set partitioning problem.

[Equation 3]

$$H = \Sigma_j c_j x_j + \Sigma_i \lambda_i [\Sigma_j A_{ij} x_j - 1]^2 \quad \text{(Equation 3)}$$

However, it is considered that the description of the Equation 3 still does not fully reflect the characteristics of the replanned plan.

Here, in the embodiment, the interaction model using the change information 163 is used. By using the interaction model, the processor of the information processing system 10 (the substitute vehicle selection unit of the present invention) can select a vehicle, in which the solution of the interaction model using the number of changes and the additional cost becomes optimal, as the substitute vehicle. As an example of the interaction model (a calculation equation), the interaction model shown by the following Equation 4 can be considered.

[Equation 4]

$$H(\{x_j\}) = \Sigma_j c_j x_j + \Sigma_i \lambda_i [\Sigma_j A_{ij} x_j - \gamma_i]^2 + \eta \Sigma_{i \in K, j} D_{ij} x_j \quad \text{(Equation 4)}$$

In Equation 4, $A_{ij}$ is a matrix of binary values of 0/1 surrounded by the thick frame 401 in FIG. 14, as shown in Equation 2 described above. As shown in Equation 2, $x_j$ in Equation 4 is also a variable that takes a binary value of 0/1, and the column of the table in FIG. 12, that is, $x_j=1$ is taken when the planned candidate j is selected, and 0 is taken when not selected.

$C_j$ is also the same as that of Equation 2, and is the cost when any planned candidate j is selected. Accordingly, a first item of Equation 4 is the sum of the costs of the plan because only the cost $C_j$ when $x_j=1$ is added, which coincides with the objective function shown in Equation 2.

$\lambda_i$, $\gamma_i$, and $\eta$ of Equation 4 are any parameters. By adjusting these parameters appropriately, the calculation by the optimization calculation unit 80 can reach the optimum solution as soon as possible. These parameters can be adjusted manually, but may be configured to be automatically adjusted by an existing method in the model calculation unit 142. When the optimization calculation unit can handle continuous variables, $\gamma_i$ may be used as a variable.

When $\gamma_i=1$ is set, Equation 4 coincides with Equation 3 which is a normal set partitioning problem.

That is, when all the vehicles and schedules (the vehicles 1 to 8 and the schedules 1 to 8 in the above example) are included in any of the selected planned candidates, and the vehicle and the schedule do not overlap each other between the selected different planned candidates, $\Sigma_j A_{ij} x_j = 1$ is obtained.

For example, in FIG. 14, $x_j=1$ is set at j=1, j=6, and j=8, and in the case of another j excluding j=1, j=6, and j=8, when $x_j=0$ is set, $\Sigma_j A_{ij} x_j = 1$ is obtained. In this case, a value in parentheses of the second item of Equation 4 becomes 0.

However, in other cases, the second item becomes a finite value, and a value of H becomes larger than when it becomes 0.

Since the optimization calculation unit 80 calculates the value of $x_j$ that minimizes the value of H as the optimum solution, the value of $x_j$ whose second item becomes the finite value is not the optimum solution. However, in this patent, $\gamma_i=1$ may not be required. This is because $\Sigma_j A_{ij} x_j = 1$ can be minimized when $\gamma_i \in (0.5, 1]$ is set. Depending on the problem, when there are a schedule and a vehicle that may or may not be included in the replanning, $\gamma_i \in (0, 1]$ may be set.

A third item of Equation 4 is a characteristic item in the embodiment, and indicates that a value of a content of the parentheses increases as the plan deviates from the original plan, and that a combination of $x_j$ that deviates significantly from the original plan is not the optimum solution.

A value of the change information 163 is used for $D_{ij}$ of the third item. Specifically, the value corresponds to a portion of a thick frame 501 in FIG. 15. In FIG. 15, in the case of assignment as originally planned, 0 is set, such that j=1, 2, and 3 are all 0. −1 is set in a mass that substitutes the schedule 8 which is the difficult-to-perform schedule such that the overall cost decreases, and when the schedule that is not originally assigned to the corresponding vehicle is assigned as shown in the addition 1, 1 is set such that the overall cost increases. As described above, since $A_{ij}$ and $D_{ij}$ are sparse matrices, in a problem in which there are several tens to several thousand or more of the number of vehicles and the number of schedules in an actual business, high speed may be appropriately applied by using the characteristics of the sparse matrices. K in Equation 4 is the number of vehicles, and the reason why a range of the sum of i of the three items is specified is that only the rows related to the schedule are summed.

By setting the constraints related to $D_{ij}$ in this manner, when looking at the entire plan, and when a large number of planned candidates, in which the schedule that is not in the original plan (for example, the additional schedule 1 in the above example) is assigned to the vehicle, are selected, the overall cost (the value of H) increases, such that the replanned plan in which the plan is significantly changed is less likely to be selected.

The form of Equation 4 and the range of the sum thereof may be changed depending on a problem so that the calculation by the optimization calculation unit 80 is completed at an early stage.

As described in detail above, with the information processing system 10 on which the replanned plan output device of the present invention is mounted, when the difficult-to-perform schedule that is difficult to be performed by the vehicle in charge occurs, the substitute vehicle for performing the difficult-to-perform schedule can be selected among a plurality of candidates for the substitute vehicle, in consideration of the number of changes of the vehicle in charge and the additional cost. Therefore, it is possible to automatically formulate the replanned plan that reduces the number of changes from the original plan and the profit and loss caused by the changes. With the information processing system 10, when it is required to replan the operation plan in real time due to an error such as an accident or the like, the information processing system 10 can be used to replan the operation plan for the day.

What is claimed is:

1. A replanned plan output device that outputs a replanned plan for an operation plan of performing planned schedules in order by an operation of a vehicle in charge, the device comprising:
   an Application Specific Integrated Circuit (ASIC);
   a processor coupled to the ASIC; and
   a memory coupled to the processor storing instructions that when executed by the processor configure the processor to:
   when a difficult-to-perform schedule that becomes difficult to be performed by the vehicle in charge among the planned schedules occurs, automatically determine another vehicle as a candidate for a substitute vehicle for performing the difficult-to-perform schedule, automatically generate an interaction model using a number of changes of the vehicle and an additional cost each of the schedules specified in the operation plan of a plurality of candidates of the substitute vehicle, and transmit the generated interaction model to the ASIC, wherein the ASIC is configured to optimize the interaction model so the number of changes and the additional cost becomes optimal, and transmit a result of the optimization to the processor, wherein the processor is configured to:

receive a result of the optimization, and automatically select the substitute vehicle for performing the difficult-to-perform schedule from the plurality of candidates for the substitute vehicle in which a solution of the optimization using the number of changes and the additional cost is optimal.

2. The replanned plan output device according to claim 1,
wherein a departure time from the beginning and an arrival time to the end are specified in each of the schedules, and wherein the processor is configured to determine the another vehicle that performs a schedule that does not overlap with a time zone from a departure time of the difficult-to-perform schedule to an arrival time thereof as the candidate for the substitute vehicle.

3. The replanned plan output device according to claim 2,
wherein the processor is configured to select a vehicle, with which the number of changes of the vehicle in charge of each of the schedules specified in the operation plan is small, from the plurality of candidates for the substitute vehicle as the substitute vehicle.

4. The replanned plan output device according to claim 2,
wherein the processor is configured to select a vehicle, the additional cost of which becomes small, from the plurality of candidates for the substitute vehicle as the substitute vehicle.

5. The replanned plan output device according to claim wherein the processor is configured to:

generate a directed graph obtained by connecting a node of the vehicle specified in the operation plan and a node of the schedule assigned to each of the vehicles in the order of execution with a directed link, generate a graph as a candidate for the replanned plan by connecting the directed link from a node related to the determined candidate for the substitute vehicle to a node of the difficult-to-perform schedule in the directed graph.

6. The replanned plan output device according to claim 5,
wherein the processor is configured to generate a graph as the replanned plan by connecting the directed link from a node related to the selected substitute vehicle to the node of the difficult-to-perform schedule in the directed graph.

7. The replanned plan output device according to claim 1,
wherein the processor is configured to:

store, as input data, information on the operation plan and accident information including time when the difficult-to-perform schedule occurs and a vehicle in charge of the difficult-to-perform schedule, determine another vehicle, which is a vehicle other than the vehicle in charge and specified in the operation plan, as the candidate for the substitute vehicle for performing the difficult-to-perform schedule, according to the stored input data.

* * * * *